US007027799B2

(12) United States Patent
Morin et al.

(10) Patent No.: US 7,027,799 B2
(45) Date of Patent: Apr. 11, 2006

(54) REAL TIME CHARGING OF DELIVERY AND RECEIPT OF SHORT MESSAGE SERVICE IN A TELECOMMUNICATIONS NETWORK

(75) Inventors: Stephane Morin, Pierrefonds (CA); Susan Anctil, Dorval (CA); Joseph Gang Yan, Montreal (CA); Patricia Fernandez, Montreal (CA); Teresa Marchut-Wierzbica, Dorval (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 352 days.

(21) Appl. No.: 10/326,083

(22) Filed: Dec. 23, 2002

(65) Prior Publication Data

US 2003/0216147 A1 Nov. 20, 2003

Related U.S. Application Data

(60) Provisional application No. 60/415,137, filed on Oct. 2, 2002, provisional application No. 60/403,662, filed on Aug. 16, 2002.

(51) Int. Cl.
*H04M 11/00* (2006.01)
(52) U.S. Cl. ............... 455/408; 455/406; 455/466; 370/352; 379/114.2
(58) Field of Classification Search ........ 455/405–409, 455/466, 414.1, 560, 561; 370/310, 349, 370/352, 397; 379/114.01, 114.03, 114.05, 379/114.06, 114.8, 114.09, 114.2; 709/228, 709/229
See application file for complete search history.

(56) References Cited

U.S. PATENT DOCUMENTS

| 6,393,269 | B1 * | 5/2002 | Hartmaier et al. | 455/406 |
| 6,463,275 | B1 * | 10/2002 | Deakin | 455/406 |
| 6,473,622 | B1 * | 10/2002 | Meuronen | 455/466 |
| 6,496,690 | B1 * | 12/2002 | Cobo et al. | 455/408 |
| 6,718,178 | B1 * | 4/2004 | Sladek et al. | 455/466 |
| 6,724,748 | B1 * | 4/2004 | Stille et al. | 370/352 |

(Continued)

FOREIGN PATENT DOCUMENTS

WO   WO 98/56202   12/1998

(Continued)

OTHER PUBLICATIONS

International Search Report No. PCT/CA03/01224 dated Nov. 25, 2003.

*Primary Examiner*—Charles N. Appiah
(74) *Attorney, Agent, or Firm*—Ericsson Canada Inc.

(57) ABSTRACT

A home Message Center (MC) in a telecommunications network is capable of receiving a short message, the short message being originated by an A-subscriber and destined to a B-subscriber, and determines that prepaid charging is applicable for the short message for at least one of the A-subscriber and the B-subscriber. A PrePaid Charging Service Control Point (PPC SCP) is connected to the home MC and is responsible of prepaid accounting for the at least one of the A-subscriber and the B-subscriber. The home MC sends to a PPC SCP an indication for notifying the PPC SCP that prepaid charging is applicable for the short message for the at least one of the A-subscriber and the B-subscriber, and based on the indication, the PPC SCP charges a prepaid account of the at least one of the A-subscriber and the B-subscriber for the short message.

12 Claims, 22 Drawing Sheets

U.S. PATENT DOCUMENTS

| | | | |
|---|---|---|---|
| 6,801,781 B1 * | 10/2004 | Provost et al. | 455/466 |
| 6,907,116 B1 * | 6/2005 | Ung et al. | 379/114.16 |
| 6,961,412 B1 * | 11/2005 | Ruckart et al. | 379/114.2 |
| 2001/0029174 A1 | 10/2001 | Herajarvi et al. | 455/406 |
| 2001/0039191 A1 * | 11/2001 | Maierhofer | 455/466 |
| 2002/0029189 A1 * | 3/2002 | Titus et al. | 705/39 |
| 2002/0098856 A1 | 7/2002 | Berg et al. | 455/466 |
| 2002/0115424 A1 * | 8/2002 | Bagoren et al. | 455/408 |
| 2003/0036394 A1 * | 2/2003 | Henry-Labordere | 455/466 |
| 2003/0050042 A1 | 3/2003 | Olah | 455/406 |
| 2003/0157925 A1 * | 8/2003 | Sorber et al. | 455/406 |

FOREIGN PATENT DOCUMENTS

| | | |
|---|---|---|
| WO | WO 00/04701 | 1/2000 |
| WO | WO 01 22761 A | 3/2001 |
| WO | WO 02/07454 | 1/2002 |

* cited by examiner

REAL TIME CHARGING OF DELIVERY AND RECEIPT OF SHORT MESSAGE SERVICE IN A TELECOMMUNICATIONS NETWORK

PRIORITY STATEMENT UNDER 35 U.S.C S.119 (E) & 37 C.F.R. S.1.78

This non-provisional patent application claims priority based upon the prior U.S. provisional patent applications entitled "Updated PN-4760 stage 2 scenarios for prepaid charging of SMS", application No. 60/403,662, filed Aug. 16, 2002, in the names of Stephane Morin and Susan Anctil, and "Protocol modifications to PN-4760 for prepaid & protocol definition of SM_ANLYZD for SMS prepaid", application No. 60/415,137, filed Oct. 2, 2002, in the names of Stephane Morin and Susan Anctil.

BACKGROUND OF THE INVENTION

1. Field of the Invention

The invention relates to PrePaid Charging (PPC) of Short Message Service (SMS) messages in a telecommunications network.

2. Description of the Related Art

Nowadays, in a circuit switched network it is possible for a voice or data subscriber of telecommunication services to subscribe to PrePaid services. For doing so, the subscriber has to establish a Prepaid account in a PrePaid Charging (PPC) system, which is managed by a service provider. The subscriber may request the notification of current PrePaid Charging (PPC) account information at any time from a PPC system. The notification may be provided by tone announcement, voice announcement, or display text. As an example, a PPC subscriber can access his account by first accessing an Interactive Voice Response (IVR). The IVR may be connected to a serving Mobile Switching Center (MSC) of the Prepaid subscriber. The IVR is further connected to a Prepaid system that contains the account of the Prepaid subscriber. With this the balance of a Prepaid subscriber can be prompted to the Prepaid subscriber on demand. The Prepaid subscriber may also increase the credit of his account for further usage.

As of today, an A-subscriber can subscribe to services such as a Short Message Service (SMS), which allows him to send text messages (SMS messages) to another subscriber (B-subscriber) of the service. By subscribing to such a service, the A-subscriber might also be allowed to receive text message from the B-subscriber or any other subscriber. The A-subscriber and the B-subscriber can be located in the same network and served by the same network entities or can be located in two different networks, or can simply have two distinct SMS service providers. However, any of this usage requires the short message to be originated and to be terminated. For doing so, Mobile Station-originated Short Message Service and Mobile Station-terminated Short Message Service are necessary.

The functionality for delivering the SMS is done by the Message Centers (MCs) of the sending and receiving subscriber. However, even though it is possible to send and receive SMS messages, it is not possible with the existing prior art implementations to charge or to deny charging in real time for each and every SMS sent and received by a PrePaid subscriber. Current methods described in the ANSI-41 and IS-826 standards, fail to provide support for charging and possibly blocking in real-time the usage of SMS by a PrePaid subscriber. The ANSI-41 and IS-826 standards are included herein by reference. Currently, a subscriber who sends or receives an SMS is charged for that event automatically without any prior validation of the subscriber's PPC account. For that reason there is a need for providing a real-time PrePaid Charging for SMS delivery. The invention provides a solution to this problem.

SUMMARY OF THE INVENTION

It is therefore one broad object of this invention to provide a method for PrePaid Charging of short messages in a telecommunications network, the method comprising the steps of:

receiving a short message at a home Message Center (MC), the short message being originated by an A-subscriber and destined to a B-subscriber;

determining at the home MC that prepaid charging is applicable for the short message for at least one of the A-subscriber and the B-subscriber;

sending from the home MC to a PrePaid Charging Service Control Point (PPC SCP) an indication for notifying the PPC SCP that prepaid charging is applicable for the short message for the at least one of the A-subscriber and the B-subscriber; and charging at the PPC SCP a prepaid account of the at least one of the A-subscriber and the B-subscriber for the short message.

It is also another object of the present invention to provide a telecommunications network comprising:

a home Message Center (MC) being capable of receiving a short message, the short message being originated by an A-subscriber and destined to a B-subscriber, and determining that prepaid charging is applicable for the short message for at least one of the A-subscriber and the B-subscriber;

a PrePaid Charging Service Control Point (PPC SCP) connected to the home MC, the PPC SCP being responsible of prepaid accounting for the at least one of the A-subscriber and the B-subscriber;

wherein the home MC sends to a PPC SCP an indication for notifying the PPC SCP that prepaid charging is applicable for the short message for the at least one of the A-subscriber and the B-subscriber, and wherein based on the indication, the PPC SCP charges a prepaid account of the at least one of the A-subscriber and the B-subscriber for the short message.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

Figure 1:
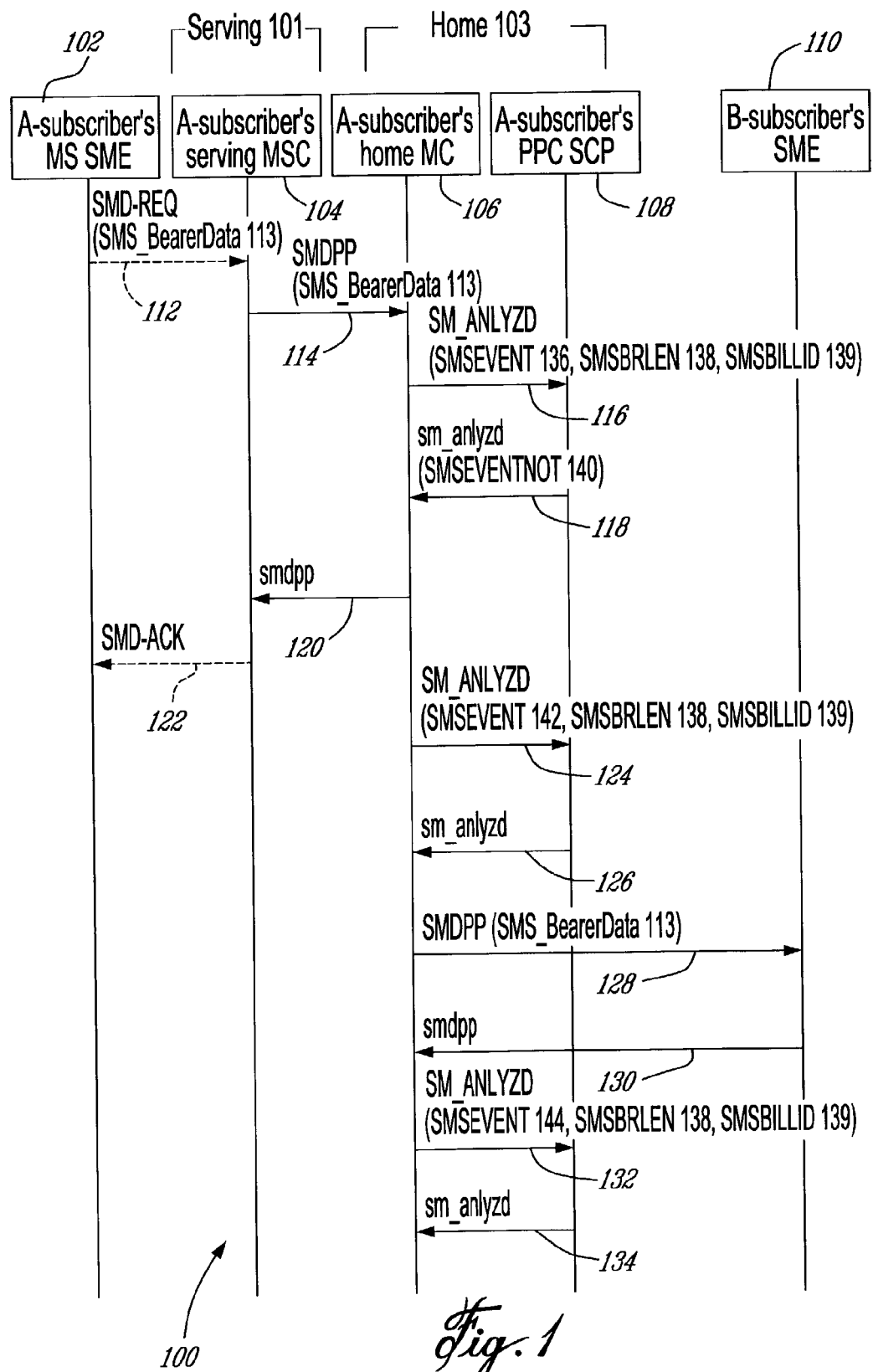
FIG. 1 is a flow chart showing an exemplary flow of messages for PrePaid Charging (PPC) of Mobile Station-originated short message delivery in a telecommunications network in accordance to the invention.

The following abbreviations are being used in conjunction of the description of the preferred embodiments of the present invention throughout the present description of the exemplary embodiments of the invention:
MS: Mobile Station;
MS-based SME: Mobile Station-based SME;
MSC: Mobile Switching Center;
PPC: PrePaid Charging
SMD-REQ: Short Message Delivery Request;
SMD-ACK: Short Message Acknowledge Delivery Request;
SMD-NACK: Short Message Negative Acknowledge Delivery Request;
SMDPP: Short Message Delivery Point-To-Point;
SME: Short Message Entity
SMS: Short Message Service;
SM_ANLYZD: Short Message Analyzed;
SMSBILLID: SMS_BillingID;
SMSBRLEN: SMS_Bearerlength;
SMSEVENT: SMS_Event;
SMSEVENTNOT: SMS_EventNotification;
SMSPMCNT: SMS_PendingMessageCount; and
SMSREQ: SMSRequest INVOKE.

A PrePaid subscriber establishes an account with a service provider to access telecommunications services such as voice and data communications in his home network and roaming networks. Charges for telecommunications services are applied to a PrePaid account of the subscriber by decrementing the account in real time based on a certain rate per usage. The PrePaid subscriber may also be notified about his account balance at the beginning, during or at the end of a telecommunication service. When the account balance is low, the subscriber may be notified so the subscriber may refill the account. When the account balance is below a pre-defined threshold, the subscriber's use of telecommunications services may be de-authorized. This invention allows a prepaid A-subscriber that subscribes to Short Message Service (SMS) and PrePaid Charging (PPC) with a service provider to prepay and to send a short message to a destination SME. This invention also allows a PrePaid B-subscriber that subscribes to SMS and PPC with a service provider to prepay and to receive a short message from a sending SME. The short message comprises a text message which length can be limited by a service provider.

The A-subscriber and the B-subscriber can subscribe to the same service provider or to different service providers. For doing so, the problem of notifying the network on the treatment to apply to a short message has to be solved for both the Mobile Station-originated (MS-originated) and the Mobile Station-terminated (MS-terminated) operations of the short message. For that reason, a Short Message Analyzed (SM_ANLYZD) operation is used by an MC to provide notification for Intelligent Network (IN) services such as positioning or charging to a service logic network element such as a Service Control Point (SCP), a Service Node (SN) or network element that can provide services to a subscriber. The SM_ANLYZD operation notifies the logic element that PPC is applicable to the short message. After that, the logic network element may then invoke a service or services for a subscriber. A chargeable event is any event initiated either by the subscriber or by the network that may result in a decrease or increase of a subscriber's PPC account balance such as "MS-originated short message delivery attempt to destination SME", "Successful MS-originated short message delivery to destination SME", "Unsuccessful MS-originated short message delivery to destination SME", "MS-originated short message deleted by MC", or any other pertinent events that can affect delivery or PPC of short messages in a telecommunications network.

The first embodiment of the invention relates to an MS-originated short message while the second embodiment of the invention relates to an MS-terminated short message.

Figure 2A:
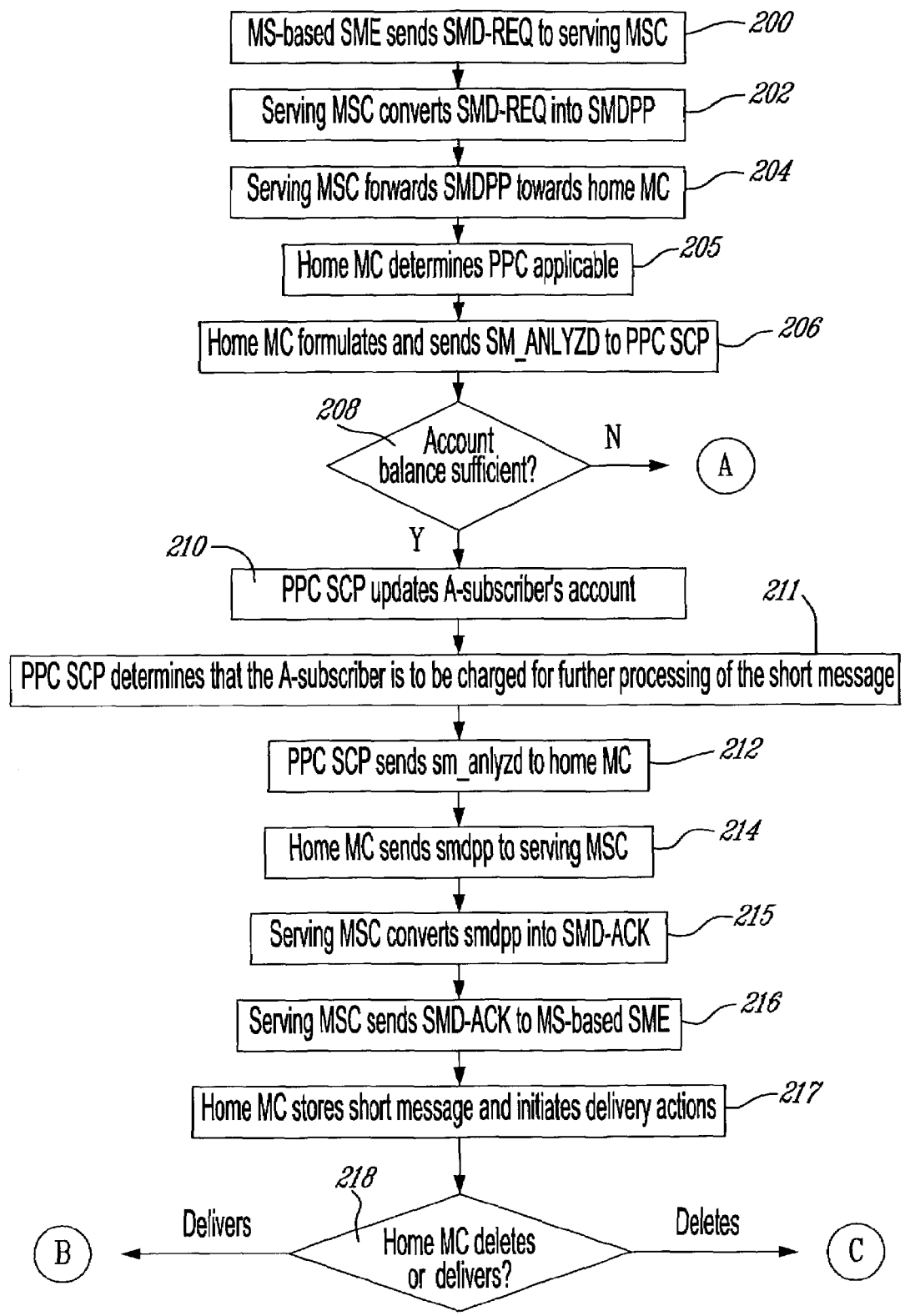
FIGS. 2A–2E are flow charts showing a method for PPC of Mobile Station-originated short message delivery in a telecommunications network in accordance to the invention.

Reference is now made concurrently to FIG. 1, which is a flow chart showing an exemplary flow of messages for PPC of Mobile Station-originated short message delivery in a telecommunications network 100, and to FIG. 2A, which is a flow chart showing a method for PPC of Mobile Station-originated short message delivery in the telecommunications network 100 in accordance to the invention.

The telecommunications network 100 comprises a serving network 101 of an A-subscriber in which the A-subscriber is currently roaming and registered, a home network 103 of the A-subscriber where a Mobile Station-based Short Message Entity (MS-based SME) 102 of the A-subscriber is defined. The home network of the A-subscriber comprises a home Message Center (MC) 106 for storing short messages sent from and received for the A-subscriber and a PPC Service Control Point (PPC SCP) 108 associated to the A-subscriber for storing and managing an account of the A-subscriber. The home MC 106 also stores the A-subscriber's PPC profile for retrieving information associated to the A-subscriber's PPC SCP 108. The serving network comprises a serving Mobile Switching Center (MSC) 104 for providing switching capabilities to the MS-based SME 102. The telecommunications network 100 also comprises a B-subscriber's SME 110 for receiving and storing short messages sent to the B-subscriber. The SME 110 may comprise a MS-based SME, a serving MSC, a destination MC, and a PPC SCP having respectively the same or different description as the one previously disclosed for the MS-based SME 102, the serving MSC 104, the home Message Center (MC) 106, and the PPC SCP 108. These network elements are not shown on FIG. 1, since the origination of short messages is discussed in the first embodiment of the invention of FIG. 1 and that the B-subscriber's SME 110 represents only an end point for the short message. In general, it can be appreciated that this end point may comprise some other network elements. However, these network elements have to provide services to the B-subscriber.

In FIG. 1, the A-subscriber originates a short message intended for the B-subscriber from his MS-based SME 102 (step 200). The MS-based SME 102 formulates and sends, to the serving MSC 104, an air interface short message delivery request (SMD-REQ) message 112 including a short message (SMS_BearerData parameter 113) and other parameters such as an address of the B-subscriber and an address of the A-subscriber. Upon reception of the message, the serving MSC 104 converts the SMD-REQ message 112 into an SMS Delivery Point-To-Point (SMDPP) message 114 (step 202) and forwards it towards the A-subscriber's home MC 106, at step 204. Following this, the A-subscriber's home MC 106 receives the SMS and determines that the A-subscriber is provisioned and configured for PPC of MS-originated short messages (step 205). At step 206, the home MC 106 formulates and sends an SM_ANLYZD message 116 to the PPC SCP 108 based on an A-subscriber's PPC profile stored in the home MC 106. The SM_ANLYZD 116 is for informing the PPC SCP 108 that PPC is applicable to the short message. The SM_ANLYZD message 116 includes an SMS_Event (SMSEVENT) parameter 136 for indicating that the chargeable SMS event encountered is "MS-originated short message accepted by the network". The SM_ANLYZD message 116 also comprises an SMS_BearerLength (SMSBRLEN) parameter 138 for indicating the length of the short message (SMS_BearerData parameter 113) and an SMS_BillingID (SMSBILLID) 139 for correlating charging operations related to the SMDPP message 114. The SM_ANLYZD message 116 may also include an SMS_PendingMessageCount (SMSPMCNT) (not shown) for indicating the number of short messages in the home MC 106 that are pending for and from the MS-based-SME 102. Upon reception of the SM_ANLYZD message 116, the PPC SCP 108 verifies that the A-subscriber's account balance is sufficient (step 208).

If the A-subscriber's account balance is sufficient, the PPC SCP 108 updates the A-subscriber's account balance by decreasing the account balance (step 210). Following this, the PPC SCP 108 determines that the A-subscriber is to be charged for further processing of the MS-originated short messages (step 211). For doing so, the PPC SCP 108 generates an sm_anlyzd message 118 for responding to the SM_ANLYZD 116. The sm_anlyzd 118 includes an SMS_EventNotification (SMSEVENTNOT) parameter 140 for indicating which SMS events to be reported to the PPC SCP 108 for this short message. The SMSEVENTNOT parameter 140 contains information indicating one or more events such as "MS-originated short message delivery attempt to destination SME", "Successful MS-originated short message delivery to destination SME", "Unsuccessful MS-originated short message delivery to destination SME", "MS-originated short message deleted by MC", or any other pertinent events that can affect delivery or PPC of short messages in the telecommunications network 100. At step 212, the PPC SCP 108 sends the sm_anlyzd message 118 to the home MC 106. The sm_anlyzd 118 may include data for informing the A-subscriber of the cost of the deduction and/or the updated balance of his account. The home MC 106 receives the sm_anlyzd message 118 and responsive to the SMDPP message 114 sends an smdpp message 120 to the serving MSC 104 (step 214). The smdpp message 120 contains the SMS_BearerData (not shown) received in the sm_anlyzd message 118. The serving MSC 104 further converts the smdpp message 120 into an air interface short message acknowledge delivery request (SMD-ACK) message 122 (step 215) and sends the SMD-ACK message 122 to the MS-based SME 102 (step 216). The SMD-ACK message 122 contains the SMS_BearerData (not shown) received in smdpp message 120. The MS-based SME 102 further correlates the SMD-ACK message 122 with the SMD-REQ message 112. Afterwards, at step 217, the home MC 106 stores the short message and initiates delivery actions described in the following steps.

Figure 2B:
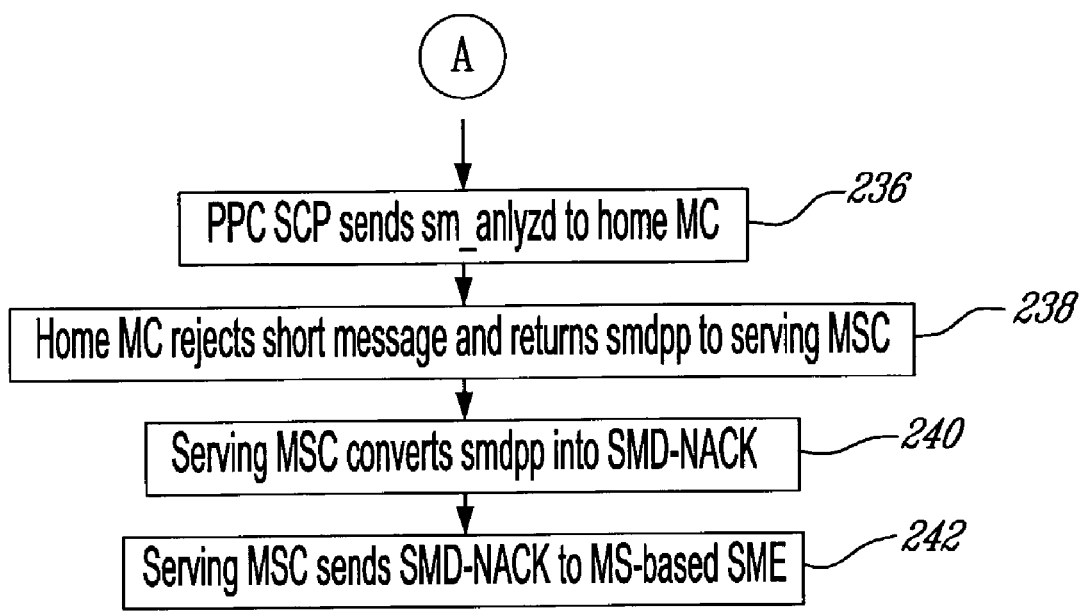
Figure 2C:
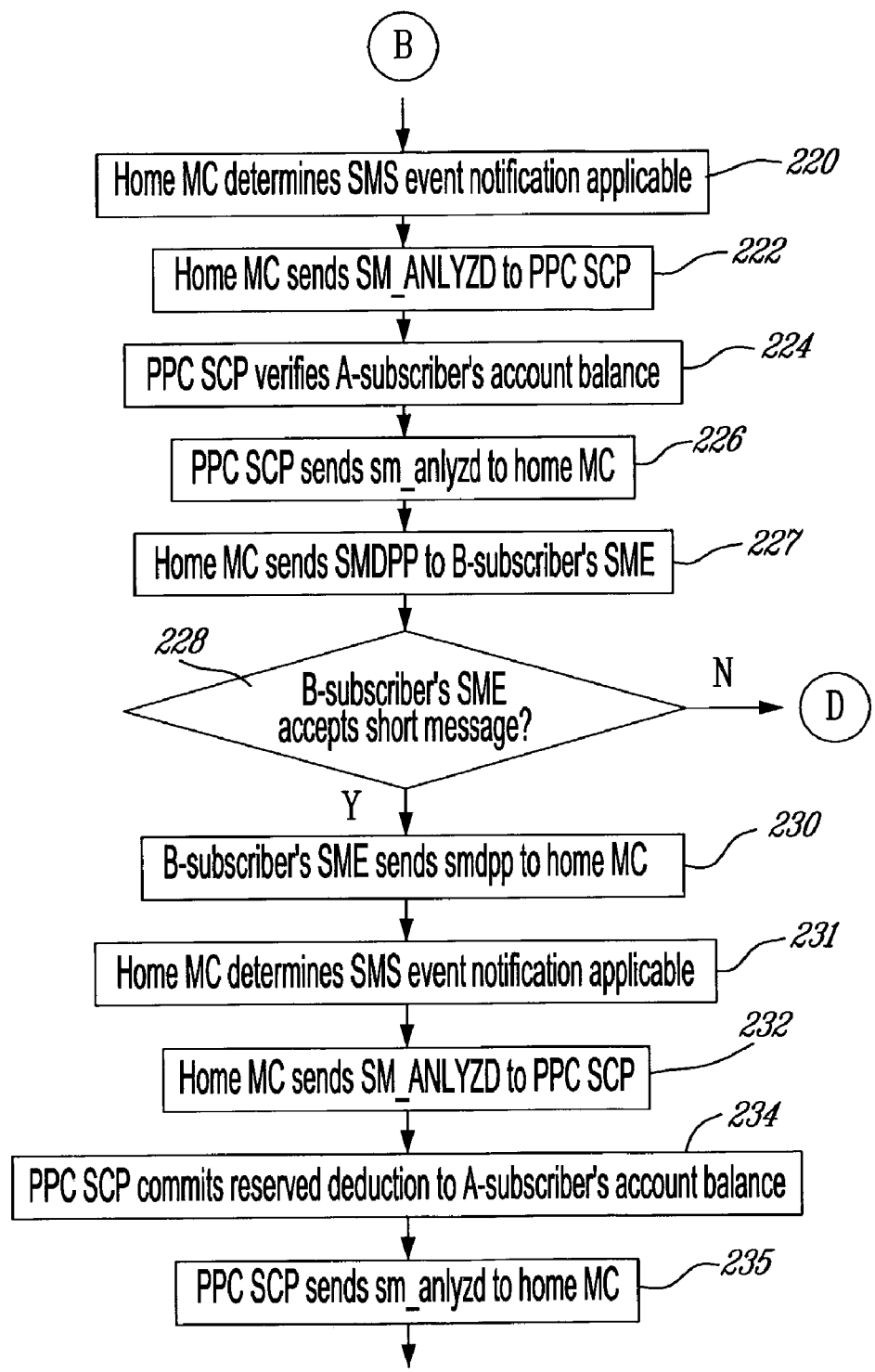

At step 218, the MC 106 determines whether the short message is to be delivered or deleted based on various reasons such as a short message lifetime expired or memory shortage. If the MC 106 delivers the short message, steps of FIG. 2C are performed. FIG. 2C, which is a flow chart showing a method for PPC of Mobile Station-originated short message delivery in the telecommunications network 100 in accordance to the invention. At step 220, the home MC 106 is ready to send the short message and determines that an SMS event notification is applicable. For doing so, the home MC 106 sends an SM_ANLYZD message 124 to the PPC SCP 108 (step 222). The SM_ANLYZD 124 is for informing the PPC SCP 108 that SMS event notification is applicable to the short message. The SM_ANLYZD message 124 includes an SMSEVENT parameter 142 indicating the chargeable event encountered as "MS-originated short message delivery attempt to destination SME". The SM_ANLYZD message 124 also includes the same SMSBRLEN 138 and SMSBILLID 139 parameters sent by the home MC 106 in the SM_ANLYZD message 116, and other parameters received in the SMDPP message 114 from the serving MSC 104. The home MC 106 may also optionally includes the SMSPMCNT parameter (not shown). Upon reception of the SM_ANLYZD message 124, the PPC SCP 108 verifies that the A-subscriber's account balance is sufficient and reserves a deduction from the A-subscriber's account balance for the cost of this chargeable event (step 224). Alternatively, the PPC SCP 108 may deduct the cost from the A-subscriber's account balance and later credit the account if the short message is not delivered. At step 226, the PPC SCP 108 formulates and sends an sm_anlyzd message 126 to the home MC 106 for responding to the SM_ANLYZD message 124. The sm_anlyzd 126 may include data for informing the A-subscriber of the cost of the deduction and/or the updated balance of his account. The home MC 106 further forwards the SMDPP message 114 in an SMDPP request message 128 including the short message sent from the MS-based SME 102 to the B-subscriber's SME 110 (step 227). At step 228, the B-subscriber's SME 110 may accept or reject the short message.

If the B-subscriber's SME 110 accepts the short message at step 228, the B-subscriber's SME 110 responds to the home MC 106 using an smdpp message 130 (step 230). At step 231, the MC 106 determines that an SMS event notification is applicable. For doing so, the home MC 106 sends an SM_ANLYZD message 132 to the PPC SCP 108 (step 232). The SM_ANLYZD message 132 includes an SMSEVENT parameter 144 indicating that the chargeable event encountered is "Successful MS-originated short message delivery to destination SME". The SM_ANLYZD message 132 also includes the same SMSBRLEN 138 and SMSBILLID 139 parameters sent by the home MC 106 in the SM_ANLYZD message 116, and other parameters received in the SMDPP message 114 from the serving MSC 104. The home MC 106 may also optionally include a SMSPMCNT parameter (not shown). Upon reception of the SM_ANLYZD message 132, the PPC SCP 108 commits deduction that has been reserved in the A-subscriber's account balance (step 234). Following this, the PPC SCP 108 generates and sends an sm_anlyzd message 134 for responding to the SM_ANLYZD message 132 (step 235). The sm_anlyzd message 134 may include data for informing the A-subscriber about the deduction and the updated account balance.

Figure 3:
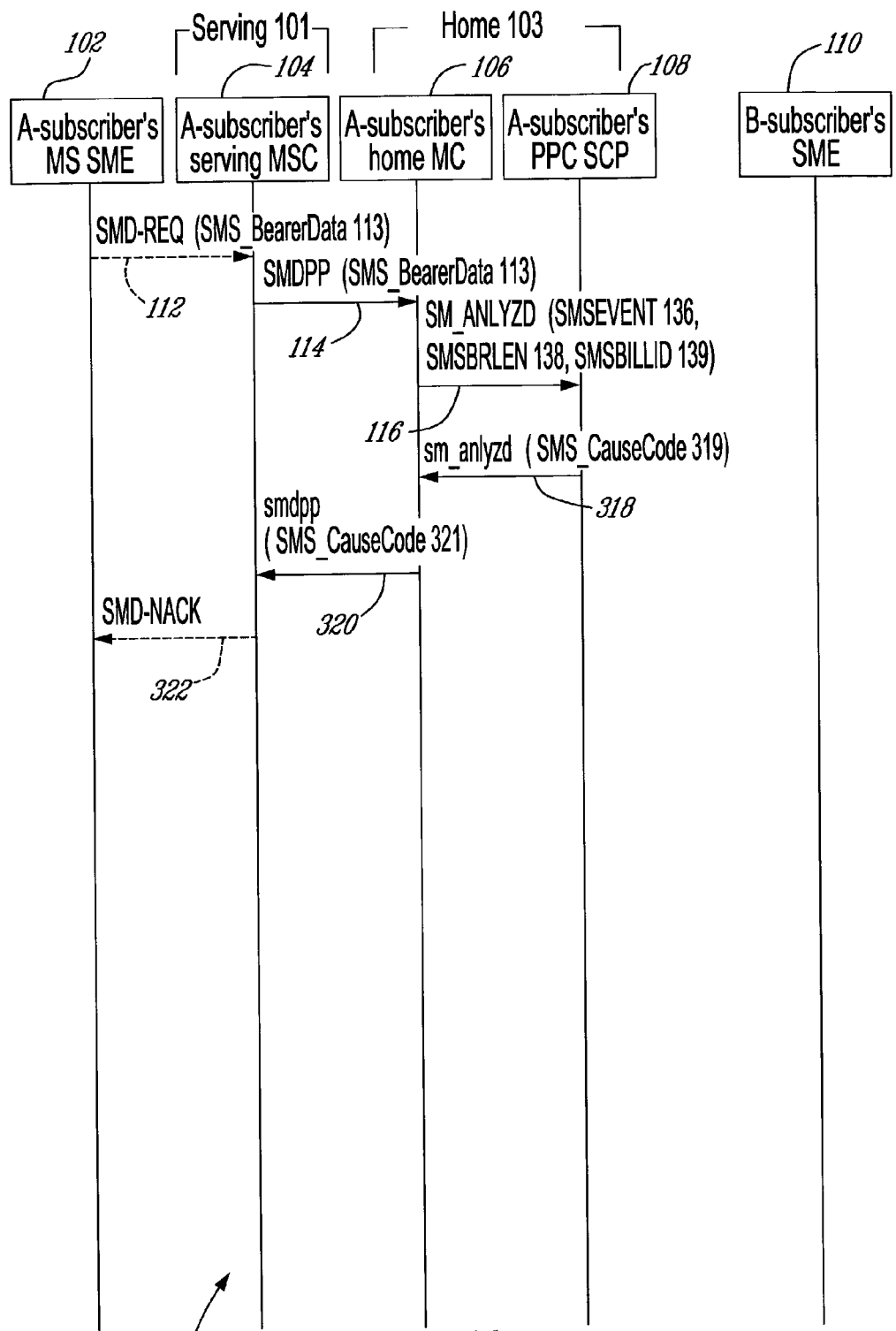
FIG. 3 is a flow chart showing an exemplary flow of messages for PPC of Mobile Station-originated short message delivery not accepted by a telecommunications network in accordance to the invention.

Alternatively, with reference being now made back concurrently to FIG. 1 and to FIG. 2A, the A-subscriber's account balance may not be sufficient at step 208 of FIG. 2A. Therefore, steps of FIG. 2B are performed. Reference is now made concurrently to FIG. 3, which is a flow chart showing an exemplary flow of messages for PPC of Mobile Station-originated short message delivery not accepted by the telecommunications network 100, and to FIG. 2B, which is a flow chart showing a method for PPC of Mobile Station-originated short message delivery in the telecommunications network 100 in accordance to the invention. In FIG. 3, the telecommunication nodes 102 to 110 and the messages 112 to 116 are the same as the ones described in FIG. 1. At step 236, the PPC SCP 108 sends back an sm_anlyzd message 318 to the home MC 106 for responding to the SM_ANLYZD message 116. The sm_anlyzd 318 includes an SMS_CauseCode parameter 319 indicating "Service Denied". Subsequently, the home MC 106 rejects the SMDPP 114 by returning to the serving MSC 104 an smdpp message 320 including an SMS_CauseCode parameter 321 indicating "Service Denied" (step 238). The MSC 104 receives the smdpp message and further converts it into an SMD-NACK message 322 (step 240). At step 242, the serving MSC sends the SMD-NACK message 322 to the MS-based SME 102 for informing the MS-based SME that the home MC 106 has rejected the short message. The MS-based SME 102 correlates the response with the SMD-REQ 112 and informs the A-subscriber of the rejection.

Figure 2D:
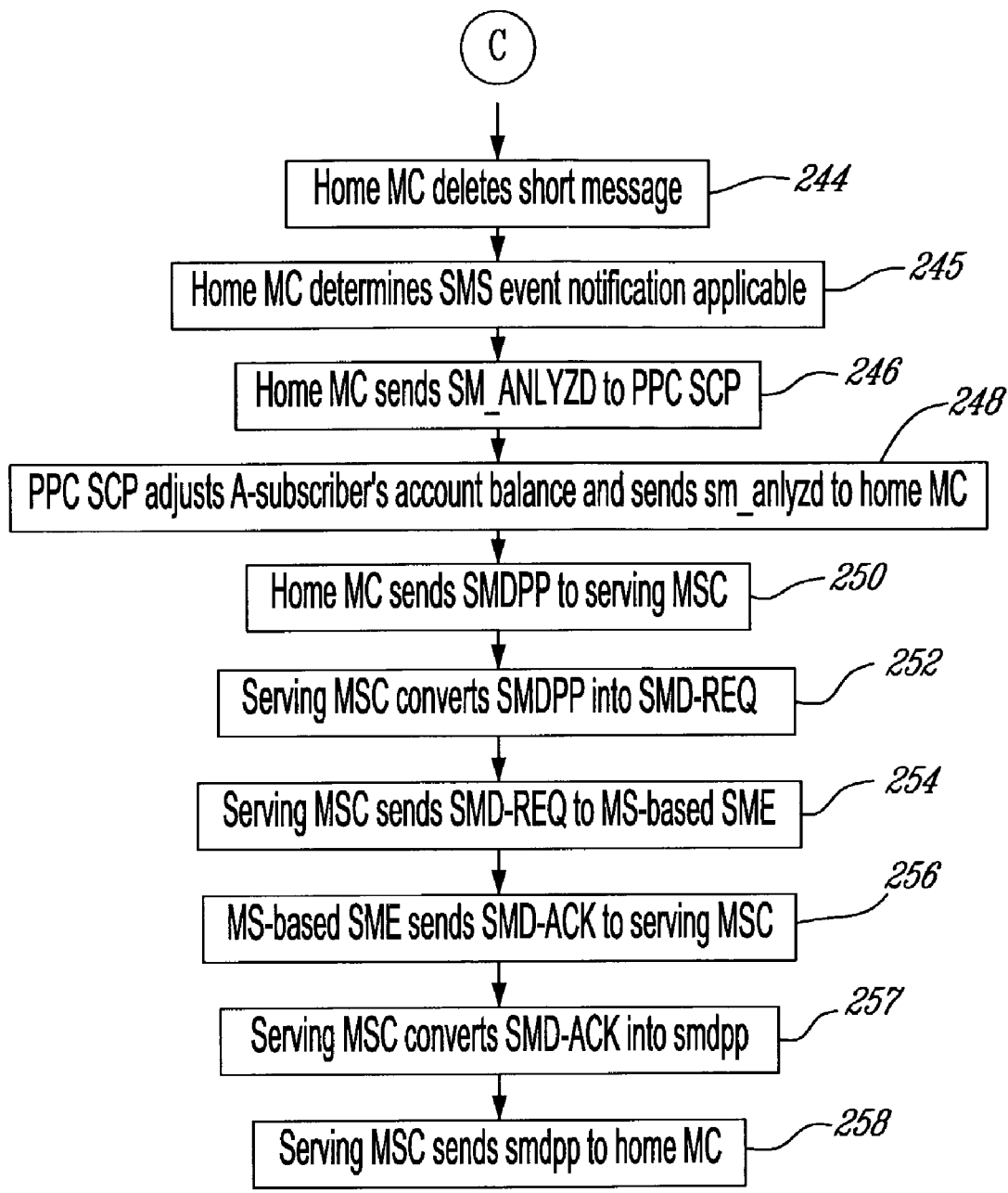
Figure 4:
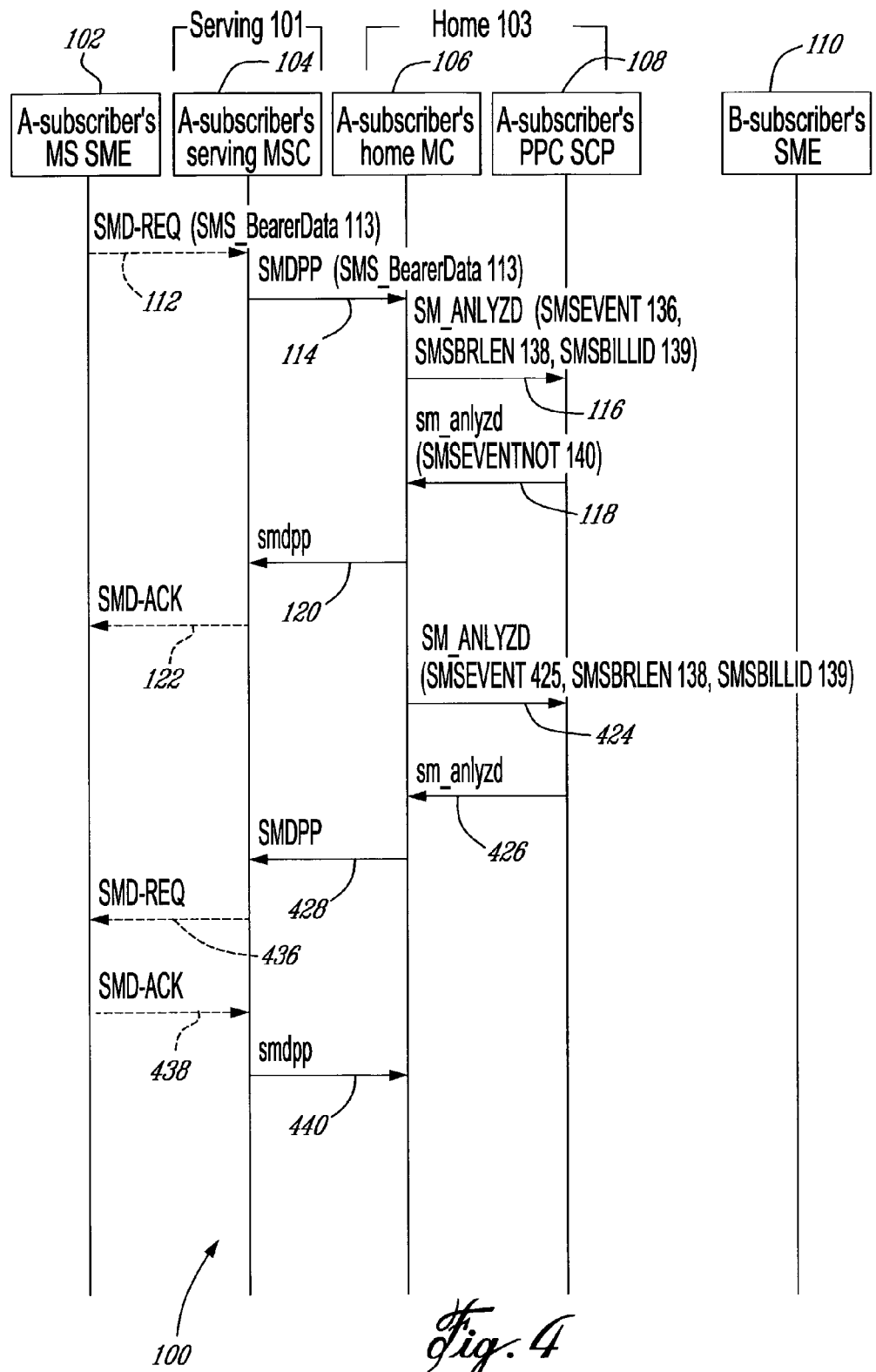
FIG. 4 is a flow chart showing an exemplary flow of messages for PPC of Mobile Station-originated short message deleted by a home Message Center (MC) in accordance to the invention.

Alternatively, with reference now made back concurrently to FIG. 1 and to FIG. 2A, the home MC 106 may delete the short message before it is delivered to the B-subscriber's SME 110 (step 218). A deletion can be done based on a reason such as a delivery time-out or a memory shortage. Reference is now made to FIG. 4, which is a flow chart showing an exemplary flow of messages for PPC of Mobile Station-originated short message deleted by the home MC 106 and to FIG. 2D, which is a flow chart showing a method for PPC of Mobile Station-originated short message delivery in the telecommunications network 100 in accordance to the invention. In FIG. 4, the telecommunication nodes 102 to 110 and the messages 112 to 122 are the same as the ones described in FIG. 1. In FIG. 4, the home MC 106 deletes the short message (step 244) and determines that an SMS event notification is applicable (step 245). For doing so, the home MC 106 formulates and sends an SM_ANLYZD message 424 to the PPC SCP 108 (step 246). The SM_ANLYZD 424 is for informing the PPC SCP 108 that SMS event notification is applicable to the short message. The SM_ANLYZD message 424 includes an SMSEVENT parameter 425 indicating that the chargeable event encountered is "MS-originated short message deleted by MC". The home MC 106 also includes in the SM_ANLYZD message sent to the MC 106 the same SMSBRLEN 138 and SMSBILLID 139 parameters sent by the home MC 106 in the SM_ANLYZD message 116, and other parameters received in the SMDPP message 114 from the serving MSC 104. The SM_ANLYZD message 116 may also include an SMS_PendingMessage-Count (SMSPMCNT) (not shown) for indicating the number of short messages in the home MC 106 that are pending for and from the MS-based-SME 102. Upon reception of the SM_ANLYZD message 424, the PPC SCP 108 adjusts the A-subscriber's account balance because the short message was deleted before delivery and sends an sm_anlyzd message 426 to the home MC 106 (step 248) for notifying to the PPC SCP 108 the deletion of the short message. The sm_anlyzd message 426 may include data for informing the A-subscriber about the adjustment and the updated account balance. If no notification is to be sent to the MS-based SME 102 after the purging of the short message, the steps 250 to 258 are not performed. Otherwise, at step 250, the MC 106 sends an SMDPP message 428 to the serving MSC 104. Following this, the serving MSC 104 converts the SMDPP message 428 into an SMD-REQ message 436 (step 252). At step 254, the serving MSC further sends the SMD-REQ message 436 to the MS-based SME 102 using the air interface address of the MS-based SME 102, which is the mobile station identification parameter MSID of the A-subscriber's MS. Next, the MS-based SME 102 responds to the SMD-REQ message 436 with a SMD-ACK message 438 to signal acceptance of the SMD-REQ message 436 (step 256). After this, the serving MSC 104 converts the SMD-ACK message 438 into an smdpp message 440 (step 257) and sends the smdpp message 440 to the home MC 106 for responding to the received SMDPP message 428 (step 258).

Figure 2E:
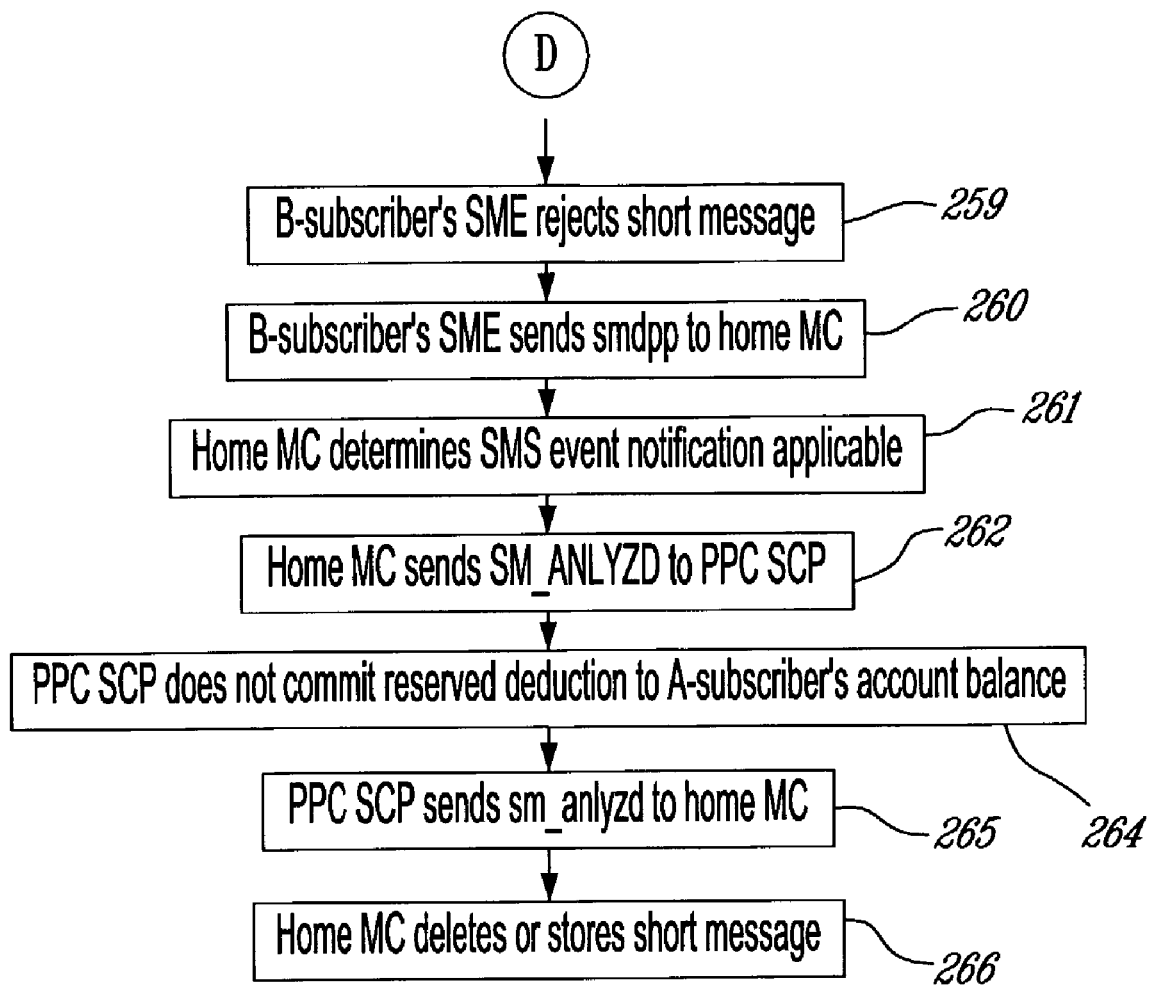
Figure 5:
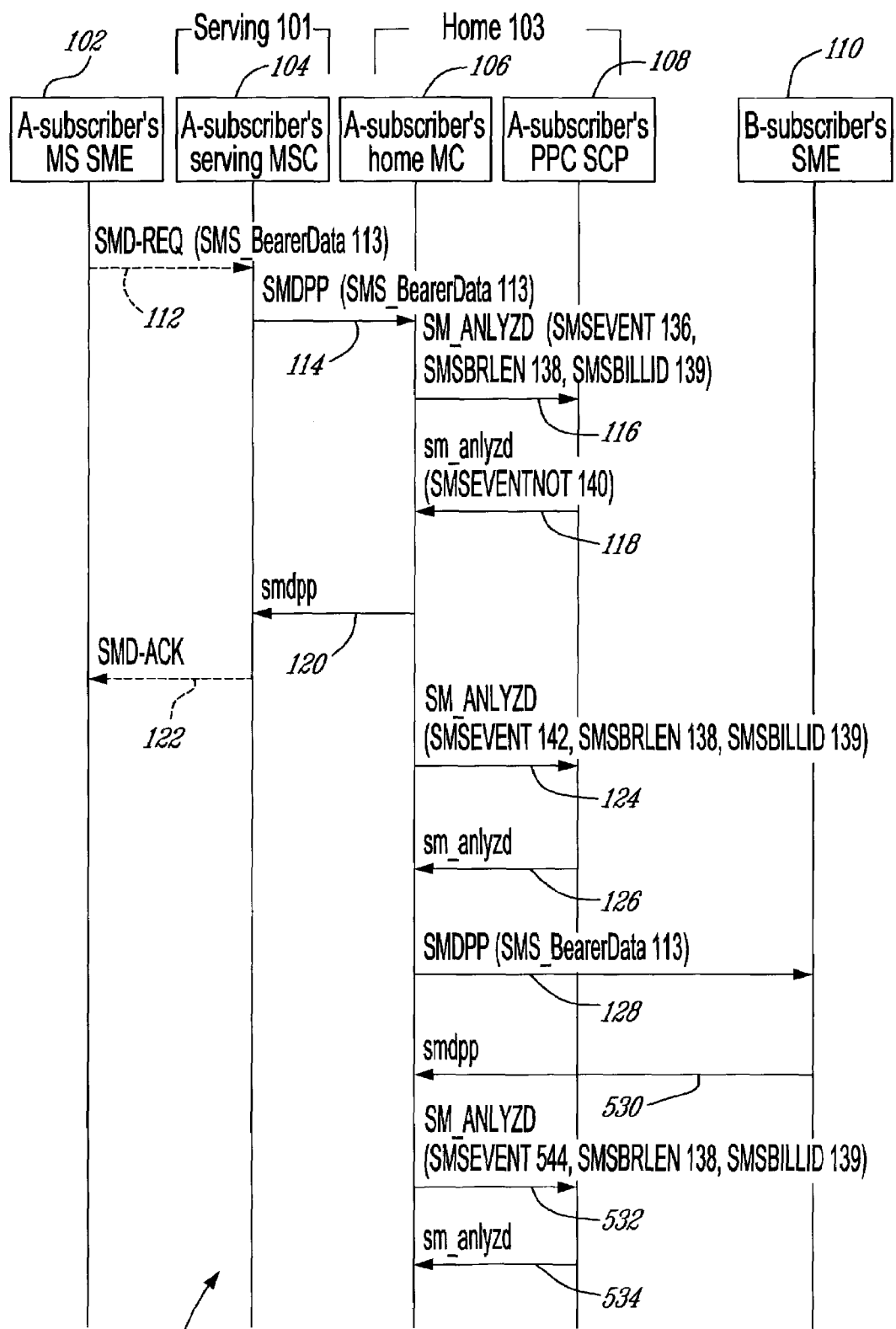
FIG. 5 is a flow chart showing an exemplary flow of messages for PPC of Mobile Station-originated short message delivery aborted by a destination Short Message Entity (SME) in accordance to the invention.

Alternatively, the B-subscriber's SME 110 may reject the short message at step 228 of FIG. 2C. In such a case, steps of FIG. 2E are performed. Reference is now made concurrently to FIG. 5, which is a flow chart showing an exemplary flow of messages for PPC of Mobile Station-originated short message delivery aborted by a destination Short Message Entity (SME) and to FIG. 2E, which is a flow chart showing a method for PPC of Mobile Station-originated short message delivery in the telecommunications network 100 in accordance to the invention. In FIG. 5, the telecommunication nodes 102 to 110 and the messages 112 to 128 are the same as the ones described in FIG. 1. In FIG. 5, the B-subscriber's SME 110 rejects the short message delivery (SMDPP 128) at step 259. The B-subscriber's SME 110 sends an smdpp message 530 with a negative acknowledgment to the home MC 106 (step 260). Next, the home MC 106 determines that SMS event notification is applicable (step 261). For doing so, the home MC 106 sends an SM_ANLYZD message 532 to the PPC SCP 108 (step 262). The SM_ANLYZD message 532 includes an SMSEVENT parameter 544 for indicating the chargeable event encountered is "Unsuccessful MS-originated short message delivery to destination SME". The SM_ANLYZD message 532 may also include in the same SMSBRLEN 138 and SMS-BILLID 139 parameters sent by the home MC 106 in the SM_ANLYZD message 116, and other parameters received in the SMDPP message 114 from the serving MSC 104. The home MC 106 may also optionally include the SMSPMCNT parameter. Upon reception of the SM_ANLYZD message 532, the PPC SCP 108 does not commit deduction that has been reserved in the A-subscriber's account balance (step 264). If the deduction was performed at a previous step, the PPC SCP 108 adjusts the A-subscriber's account balance. Following this, the PPC SCP 108 generates and sends an sm_anlyzd message 534 for responding to the SM_ANLYZD message 532 (step 265). Next, the home MC 106 simply deletes the SMS message or stores the short message for delivering it at a later time (step 266). The sm_anlyzd message 534 may include data for informing the A-subscriber about the adjustment and his updated account balance. Subsequently, the home MC 106 may initiate a notification towards the A-subscriber's MS-based SME 102 by using similar steps as steps 250 to 258 of FIG. 2D.

As mentioned previously, an A-subscriber and a B-subscriber can subscribe to the same service provider or to a different service provider. The problem of notifying the network of the treatment to apply to a short message has therefore to be solved on both the MS-originated and the MS-originated of the short message. The second embodiment of the present invention solves the issue of the MS-terminated short message.

Figure 6:
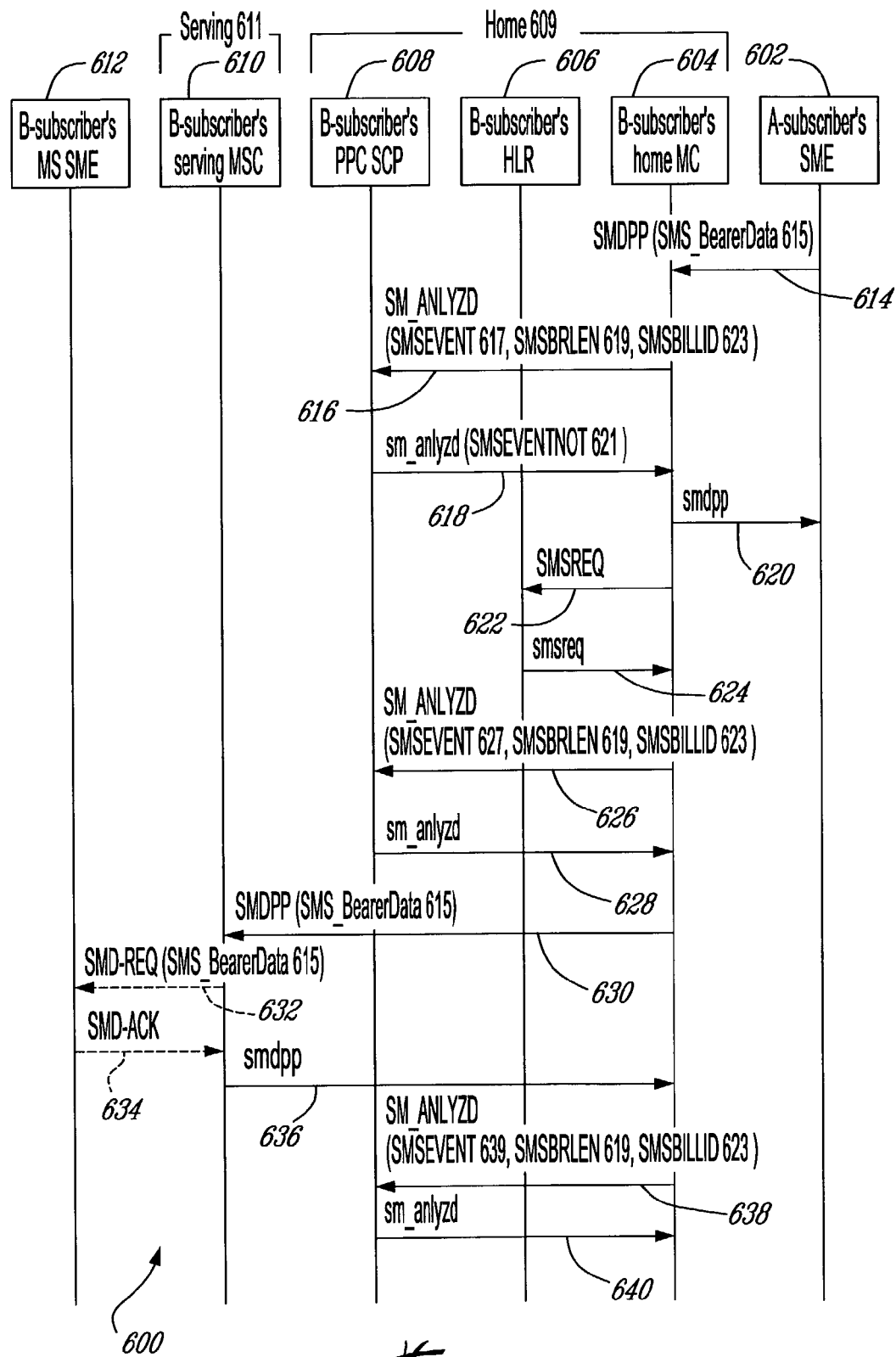
FIG. 6 is a flow chart showing an exemplary flow of messages for PPC of Mobile Station-terminated short message delivery in a telecommunications network in accordance to the invention.
Figure 7A:
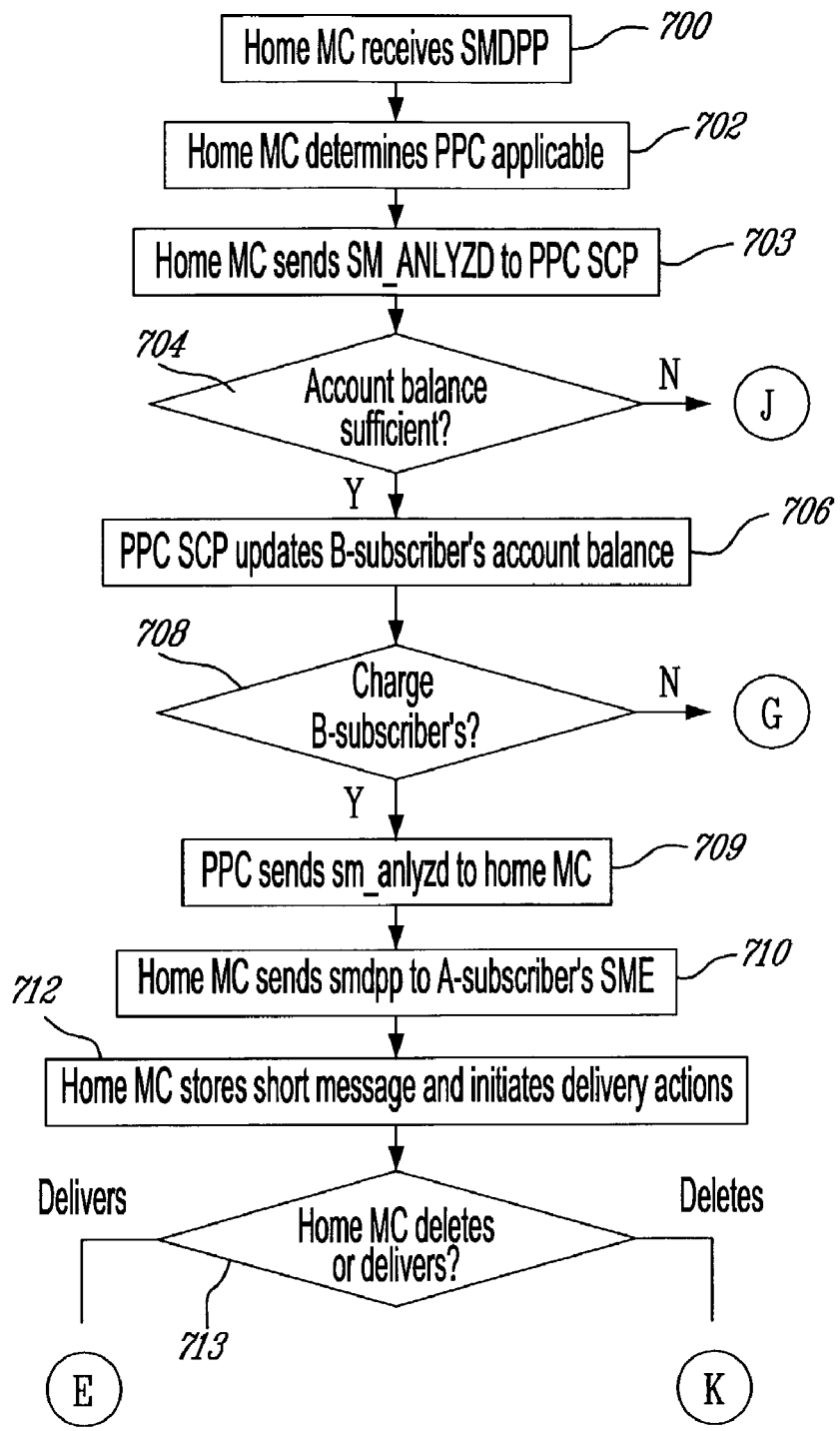
FIGS. 7A–7G are flow charts showing a method for PPC of Mobile Station-terminated short message in a telecommunications network in accordance to the invention.
Figure 7B:
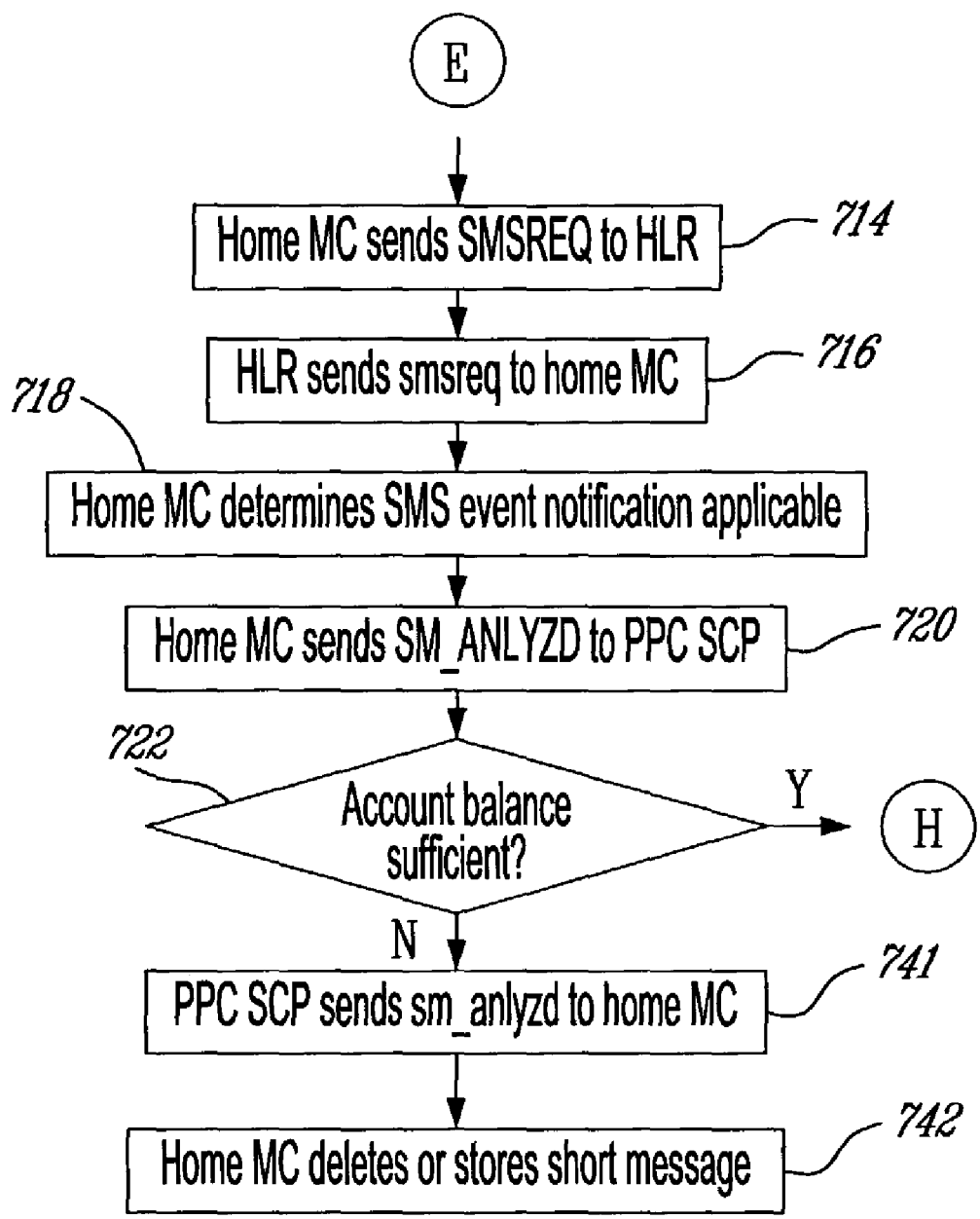
Figure 7C:
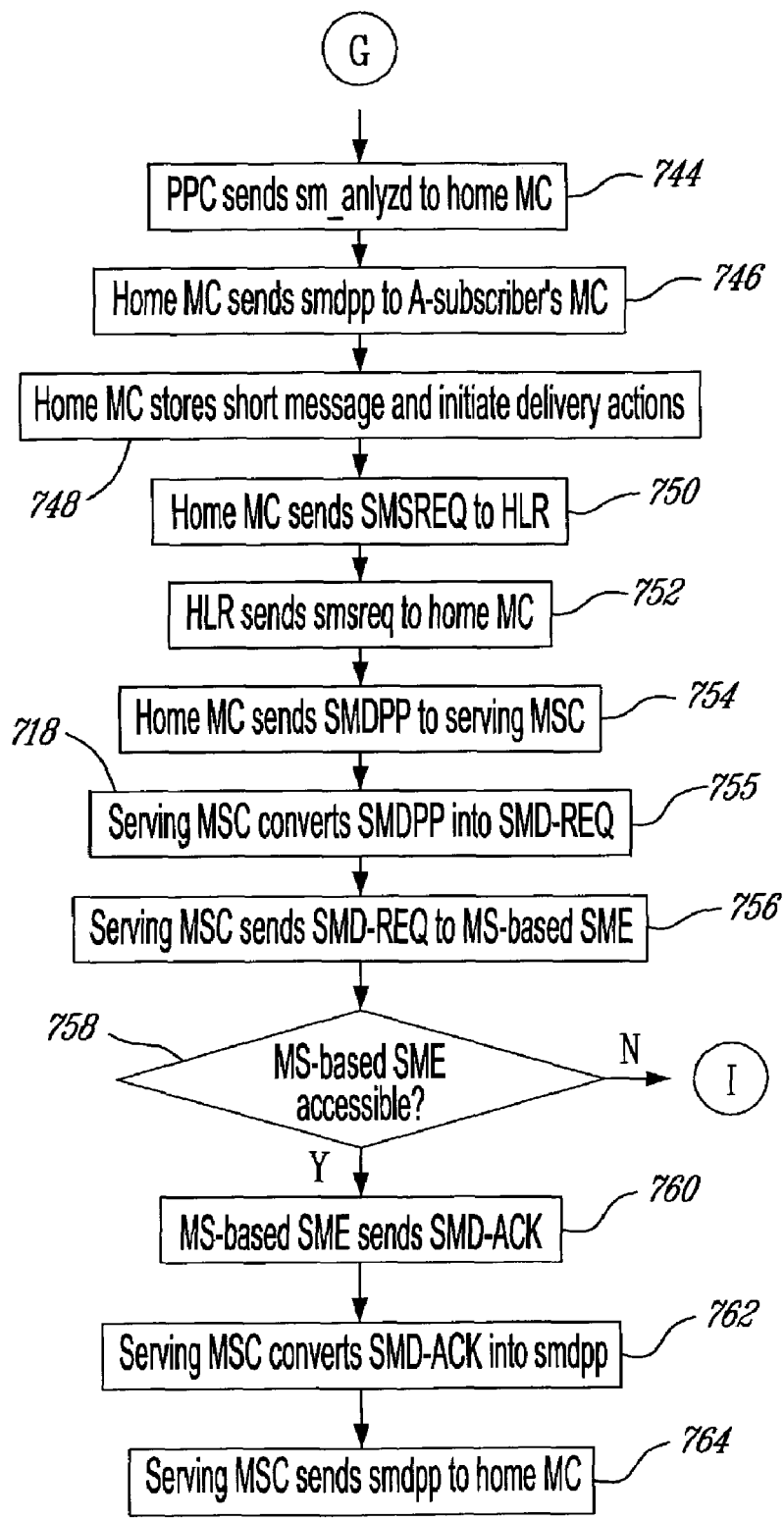
Figure 7D:
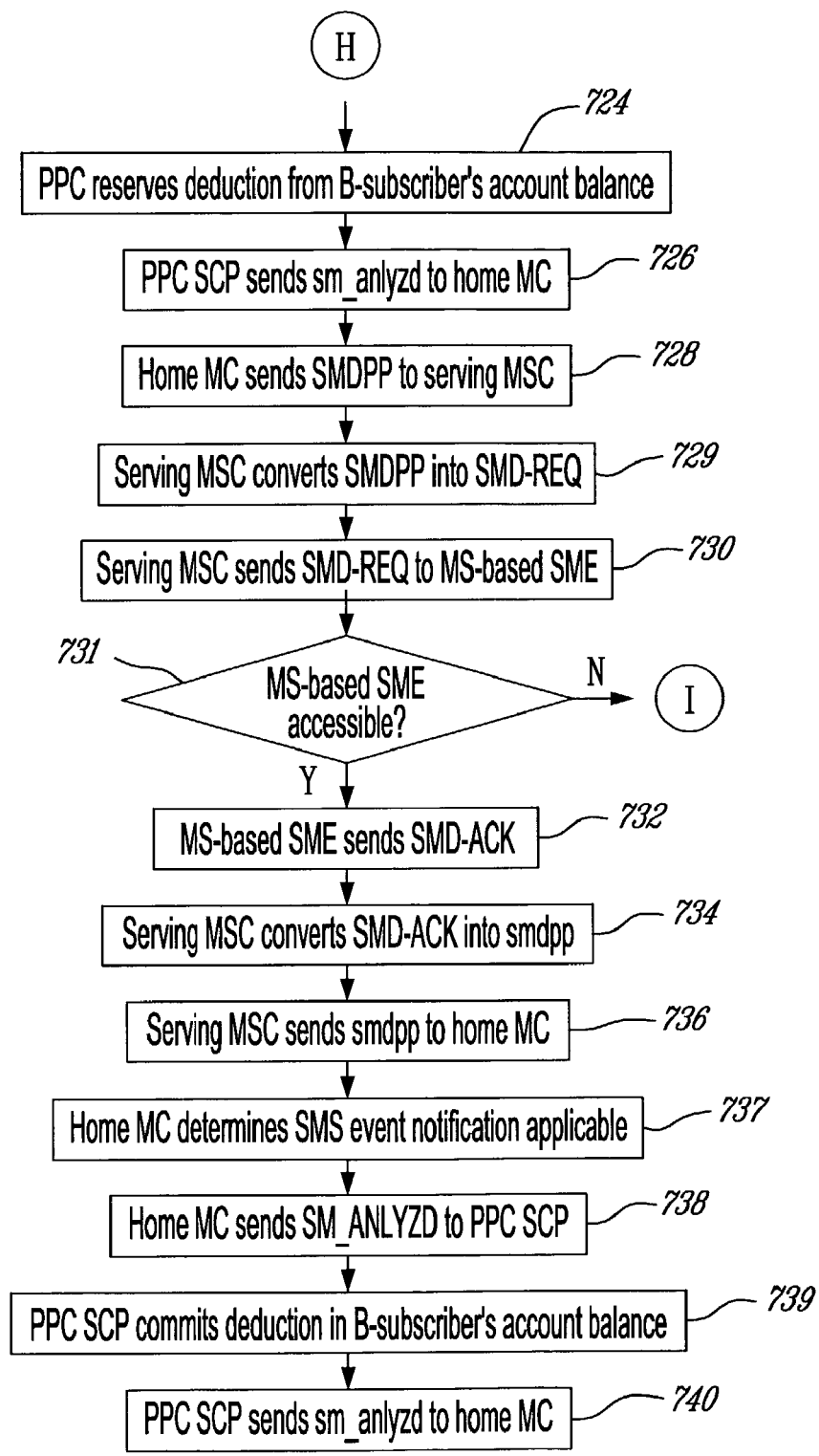

Reference is now made to FIG. 6, which illustrates a flow chart showing an exemplary flow of messages for PPC of Mobile Station-terminated short message delivery in a telecommunications network 600 and to FIGS. 7A, 7B and 7D, which illustrates flow charts showing a method for PPC of Mobile Station-terminated short message in the telecommunications network 600 in accordance to the invention. The telecommunications network 600 comprises a serving network 611 of a B-subscriber in which the B-subscriber is roaming and registered, a home network 609 of the B-subscriber where a Mobile Station-based Short Message Entity (MS-based SME) 612 of the B-subscriber is defined. The home network 609 of the B-subscriber also comprises a home Message Center (MC) 604 for storing short messages sent from and received for the B-subscriber, a PPC Service Control Point (PPC SCP) 608 associated to the B-subscriber for storing and managing an account of the B-subscriber, and a Home Location Register (HLR) 606 for storing a profile of the B-subscriber. The PPC SCP 608 may also be collocated with the HLR 606 or used as standalone. The home MC 604 also stores the B-subscriber's PPC profile for retrieving information associated to the B-subscriber's PPC SCP 608. The serving network comprises a serving Mobile Switching Center (MSC) 610 for providing switching capabilities to the MS-based SME 612. The telecommunications network 600 also comprises an A-subscriber's SME 602 for delivering short messages sent by the A-subscriber. The SME 602 may comprise an MS-based SME, a serving MSC, a PPC SCP, and a home MC having respectively the same or different description previously disclosed for the MS-based SME 612, the serving MSC 610, the PPC SCP 608, and the home Message Center (MC) 604. These network elements are not shown in FIG. 6. But, the flow of messages between these network elements can be as such as the one presented in FIG. 1 respectively for the disclosed network element. However, since the termination of short messages is discussed in the second embodiment, it is the A-subscriber's SME 602 represents the originating point for sending short message. In general, it can be appreciated that this originating point may also comprise some other network elements.

With reference being made back to FIGS. 6 and 7A, the B-subscriber's home MC 604 receives a ShortMessageDelivery Point-to-Point (SMDPP) request message 614 from the A-subscriber's SME 602 (step 700) for requesting delivery of a short message to the B-subscriber's MS-based SME 612. The SMDPP 614 includes the short message (SMS_BearerData parameter 615) as well as the data for identifying the A-subscriber's SME 602, the B-Subscriber MS based SME 612 and the B-subscriber's home MC 604. At step 702, the home MC 604 determines that PPC is applicable for short messages to the MS-based SME 612. For doing so, the home MC sends a SM_ANLYZD message 616 to the PPC SCP 608 (step 703). The SM_ANLYZD 616 is for informing the PPC SCP 608 that PPC is applicable to the short message. The SM_ANLYZD message 616 includes an SMSEVENT parameter 617 indicating that the type of SMS event encountered is "MS-terminated short message accepted by the network". The SM_ANLYZD message 616 also includes the SMSBRLEN parameter 619 indicating the length of the short message (SMS_BearerData parameter 615), the SMSBILLID 623 for correlating operations related to the SMDPP message 614. The SM_ANLYZD message 616 may also include other data received in the SMDPP 614 as well as an SMSPMCNT parameter (not shown) for indicating the number of short messages in the home MC 604 that are pending delivery for and from the MS-based SME 612. Upon reception of the SM_ANLYZD message 616, the PPC SCP 608 verifies that the B-subscriber's account balance is sufficient (step 704).

In the case that B-subscriber's account balance is sufficient, the PPC SCP 608 updates the B-subscriber's account for the chargeable event (step 706). The PPC SCP 608 determines if the B-subscriber is to be charged for further processing of this short message service delivery (step 708).

If the B-subscriber is to be charged for further processing of this short message service delivery, the PPC SCP 608 generates and sends an sm_anlyzd message 618 to the home MC 604 (step 709). The sm_anlyzd message 618 comprises an SMSEVENTNOT parameter 621 for indicating events that shall be reported to the PPC SCP 608. The SMSEVENTNOT parameter 621 contains information indicating one or more events such as "MS-terminated short message delivery attempt to MS-based SME", "MS-terminated Successful short message delivery to MS-based SME", "MS-terminated Unsuccessful short message delivery to MS-based SME", and "MS-terminated short message purged by MC". At step 710, the home MC 604 sends an smdpp message 620 to the A-subscriber's SME. Next, the home MC 604 stores the short message and initiates delivery actions (step 712). At step 713, the MC 604 determines whether the short message is to be delivered or deleted based on various reasons such as a short message lifetime expired or memory shortage. If the short message is to be delivered, the home MC 604 sends an SMSREQ message 622 to the B-subscriber's HLR 606 for retrieving an SMS routing address for the destination MS-based SME (step 714 of FIG. 7B). The HLR 606 responds to the home MC 604 with an smsreq message 624 for returning the SMS routing address (step 716). Following this, the home MC 604 determines that an SMS event notification is applicable (step 718). For doing so, the home MC 604 sends an SM_ANLYZD message 626 to the PPC SCP 608 (step 720). The SM_ANLYZD 626 is for informing the PPC SCP 608 that SMS event notification is applicable to the short message. The SM_ANLYZD message 626 includes an SMSEVENT parameter 627 indicating that the type of SMS event encountered is "MS-terminated short message delivery attempt to MS-based SME". The SM_ANLYZD message 626 also includes the same SMSBRLEN 619 and SMSBILLID 623 parameters sent by the home MC 604 in the SM_ANLYZD message 616, and other parameters received in the SMDPP message 614 from the A-subscriber's SME 602. The home MC 604 may also include the SMSPMCNT parameter (not shown). Upon reception of the SM_ANLYZD message 626, the PPC SCP 608 verifies that the account balance of the B-subscriber is sufficient (step 722).

In the case that the account balance of the B-subscriber is sufficient at step 722 of FIG. 7B, steps of FIG. 7D are performed. Reference is now made back to FIG. 6 and to FIG. 7D, which is a flow chart showing a method for PPC of Mobile Station-terminated short message in the telecommunications network 600 in accordance to the invention. At step 724, the PPC SCP 608 reserves a deduction from B-subscriber account balance for the cost of this chargeable event. Next, the PPC SCP 608 formulates and sends an sm_anlyzd message 628 to the home MC 604 (step 726). The sm_anlyzd 628 may include data, with the SMS_BearerData parameter (not shown) for informing the B-subscriber of the cost of the deduction and/or the updated balance of his account. Following this, the home MC 604 sends to the serving MSC 610 an SMDPP message 630 for delivering the short message comprising the SMS_BearerData parameter 615 received in the SMDPP message 614 (step 728). Next, the serving MSC 610 converts the SMDPP 630 into an SMD-REQ 632 (step 729). Following this, the serving MSC 610 sends an SMD-REQ to the MS-based SME 612 for delivering the short message to the MS-based SME of the B-subscriber 612 (step 730).

At step 731, the MS-based SME 612 may not be accessible. If the MS-based SME 612 is accessible the MS-based SME 612 sends an SMD-ACK message 634 to the serving MSC 610 for acknowledging reception of the short message (SMD-REQ 632) (step 732). Next, the serving MSC converts the SMD-ACK message 634 into an smdpp message 636 (step 734) and sends it to the home MC 604 of the B-subscriber for delivering the short message (step 736). At step 737, the home MC 604 determines that SMS event notification is applicable. For doing so, the home MC 604 sends an SM_ANLYZD message 638 to the PPC SCP 608 for informing the PPC SCP 608 that SMS event notification is applicable to the short message (step 738). The SM_ANLYZD message 638 includes an SMSEVENT parameter 639 indicating that the chargeable event encountered is "MS-Terminated Successful short message delivery to MS-based SME". The SM_ANLYZD message 638 also includes the same SMSBRLEN 619, and SMSBILLID 623 sent by the home MC 604 in the SM_ANLYZD message 616, and other parameters received in the SMDPP message 614 from the SME 602. The SM_ANLYZD 638 may also include the SMSPMCNT parameter (not shown). Upon reception of the SM_ANLYZD message 638, the PPC SCP 608 commits the deduction that has been reserved from the B-subscriber's account balance (step 739). Following this, the PPC SCP 608 generates and sends an sm_anlyzd message 640 for responding to the SM_ANLYZD message 638 (step 740). The sm_anlyzd message 640 may include data for informing the B-subscriber about the deduction and the updated account balance. If a notification data such as an SMS_BearerData parameter was received in the sm_anlyzd message 618, the sm_anlyzd message 628, or the sm_anlyzd message 640, the home MC 604 stores it and initiates a delivery process for this notification data. The delivery process of the notification data (not shown) shall not send any SM_ANLYZD messages sent to the PPC SCP 608 as the PPC SCP 608 generated the notification data. The delivery process of the notification data is similar to steps 630 to 636, but with the SMS_BearerData parameter set to the notification data received from the PPC SCP 608.

Figure 7E:
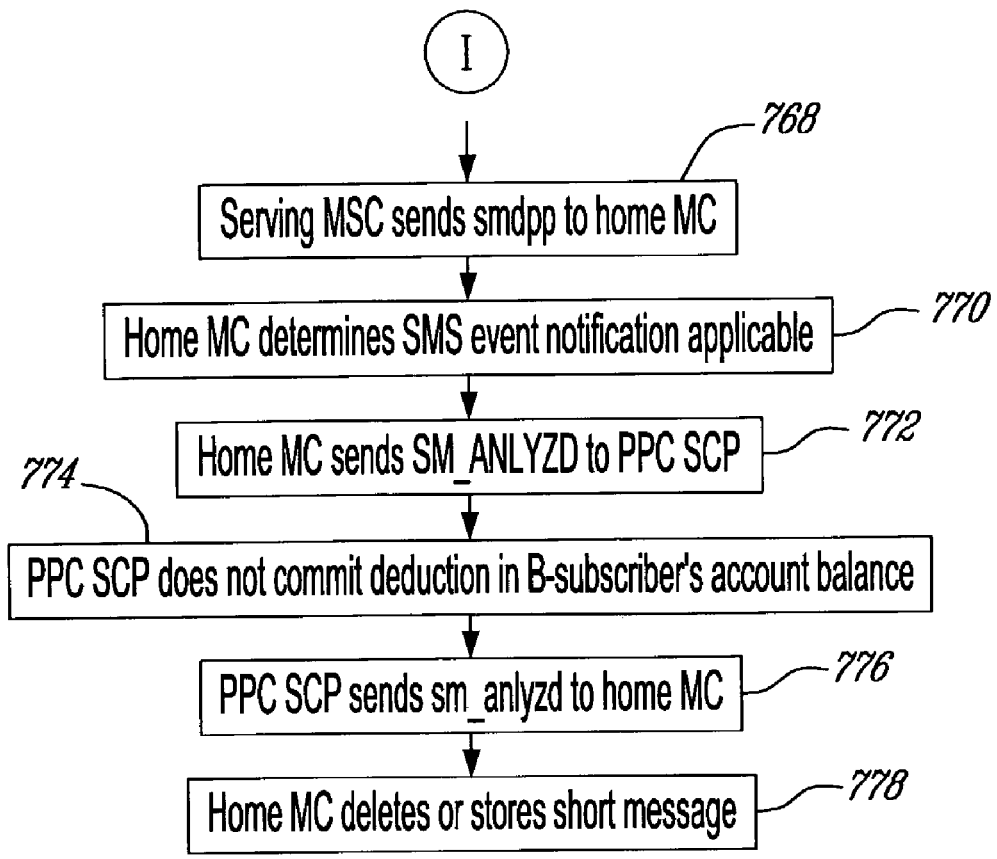
Figure 7F:
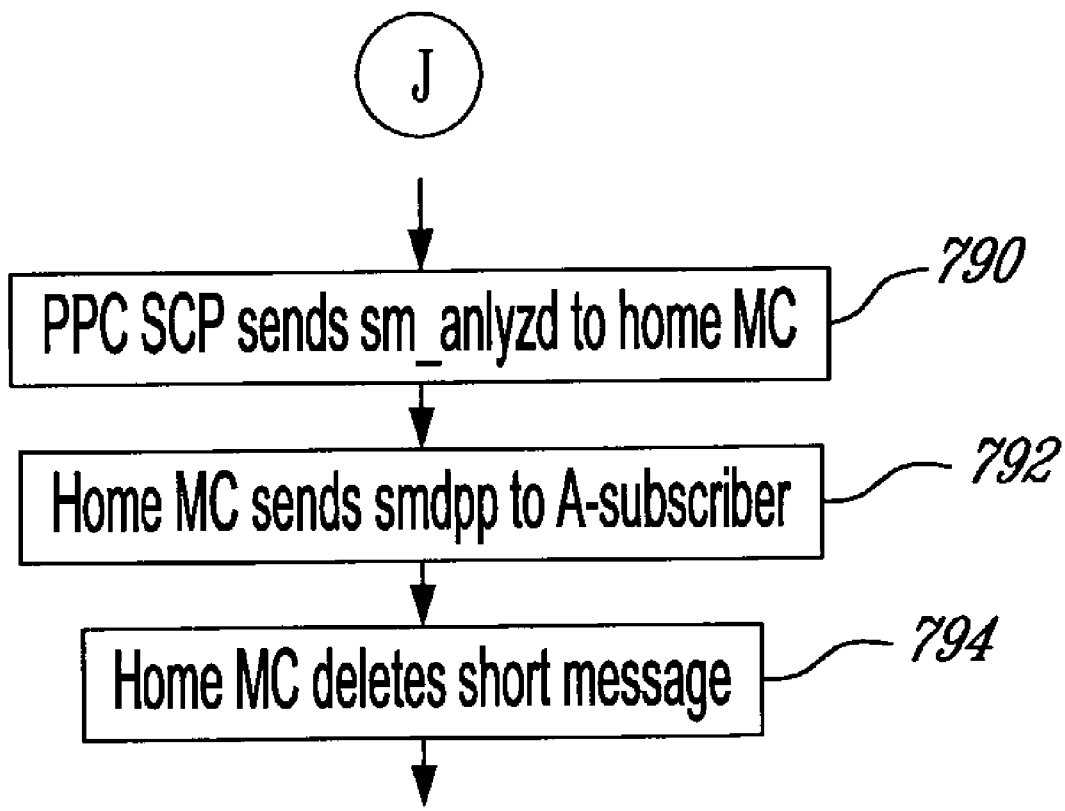
Figure 11:
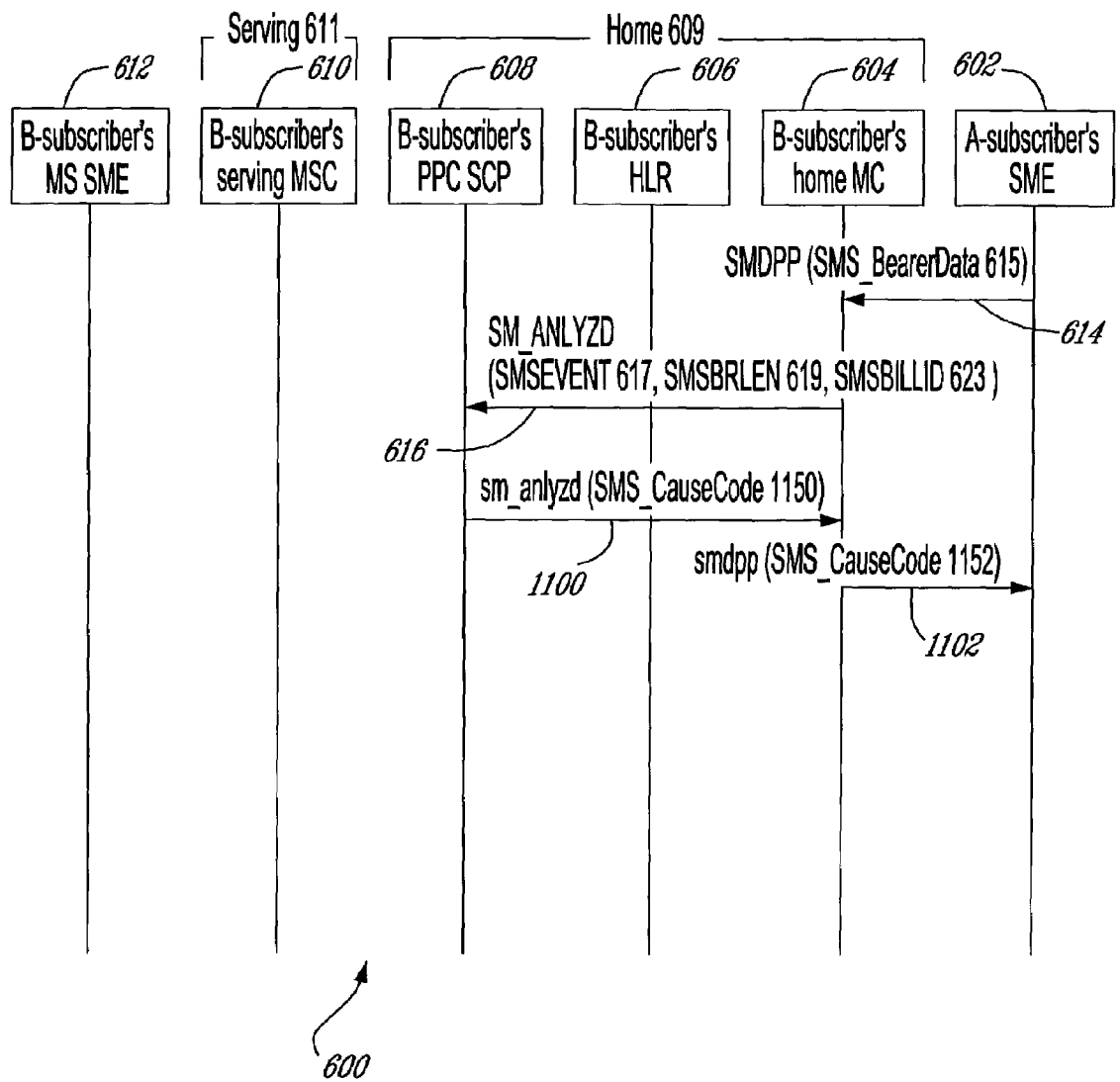
FIG. 11 is a flow chart showing an exemplary flow of messages for a Mobile Station-terminated short message not accepted by a home MC when an account balance is not sufficient in accordance to the invention.

With reference being made back concurrently to FIG. 6 and to FIG. 7A, the B-subscriber's account balance may not be sufficient at step 704. Therefore, steps of FIG. 7F are performed. Reference is now made to FIG. 11, which is a flow chart showing an exemplary flow of messages for a Mobile Station-terminated short message not accepted by the home MC 604 when an account balance is not sufficient, and to FIG. 7F, which is a flow chart showing a method for PPC of Mobile Station-terminated short message in a telecommunications network 600. In FIG. 11, the telecommunication nodes 602 to 612 and the messages 614 and 616 are the same as the ones described in FIG. 6. If the B-subscriber's account balance is not sufficient at step 704, the PPC SCP 608 sends an sm_anlyzd message 1100 to the home MC 604 for responding to the SM_ANLYZD message 616. The sm_anlyzd message 1100 includes an SMS_CauseCode parameter 1150 indicating "Service Denied" (step 790) for responding to the SM_ANLYZD message 616. Consequently, the home MC 604 rejects the SMDPP 614 by returning to the A-subscriber's SME 602 an smdpp message 1102 including an SMS_CauseCode parameter 1152 indicating "Service Denied" (step 792). Afterwards, the home MC 604 deletes the short message (step 794).

Figure 8:
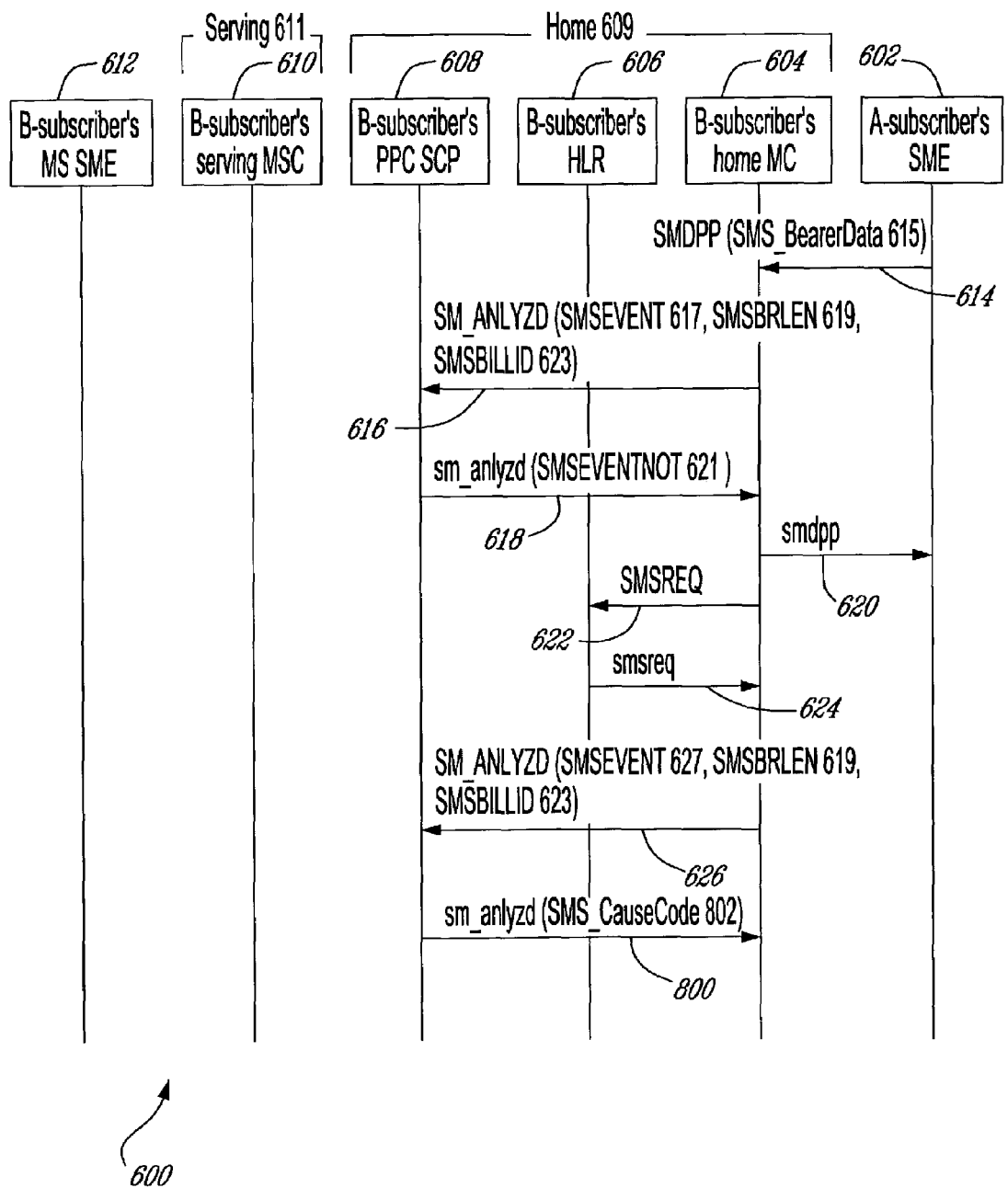
FIG. 8 is a flow chart showing an exemplary flow of messages for a Mobile Station-terminated short message not delivered to PPC MS-SME subscriber when an account balance is sufficient for acceptance but insufficient for final delivery in accordance to the invention.

Alternatively, the B-subscriber's account balance may not be sufficient at step 722 of FIG. 7B. Reference is now made concurrently to FIG. 8, which is a flow chart showing an exemplary flow of messages for a Mobile Station-terminated short message not delivered to PPC MS-SME subscriber when an account balance is sufficient for acceptance but insufficient for final delivery and back to FIG. 7B in accordance to the invention. In FIG. 8, the telecommunication nodes 602 to 612 and the messages 614 to 626 are the same as the ones described in FIG. 6. If the B-subscriber's account balance is not sufficient, the PPC SCP 608 sends back an sm_anlyzd message 800 to the home MC 604 including an SMS_CauseCode parameter 802 indicating "Service Denied" (step 741) for responding to the SM_ANLYZD 626. Afterwards, the home MC 604 may delete the short message or store it for delivery at a later time.

Figure 9:
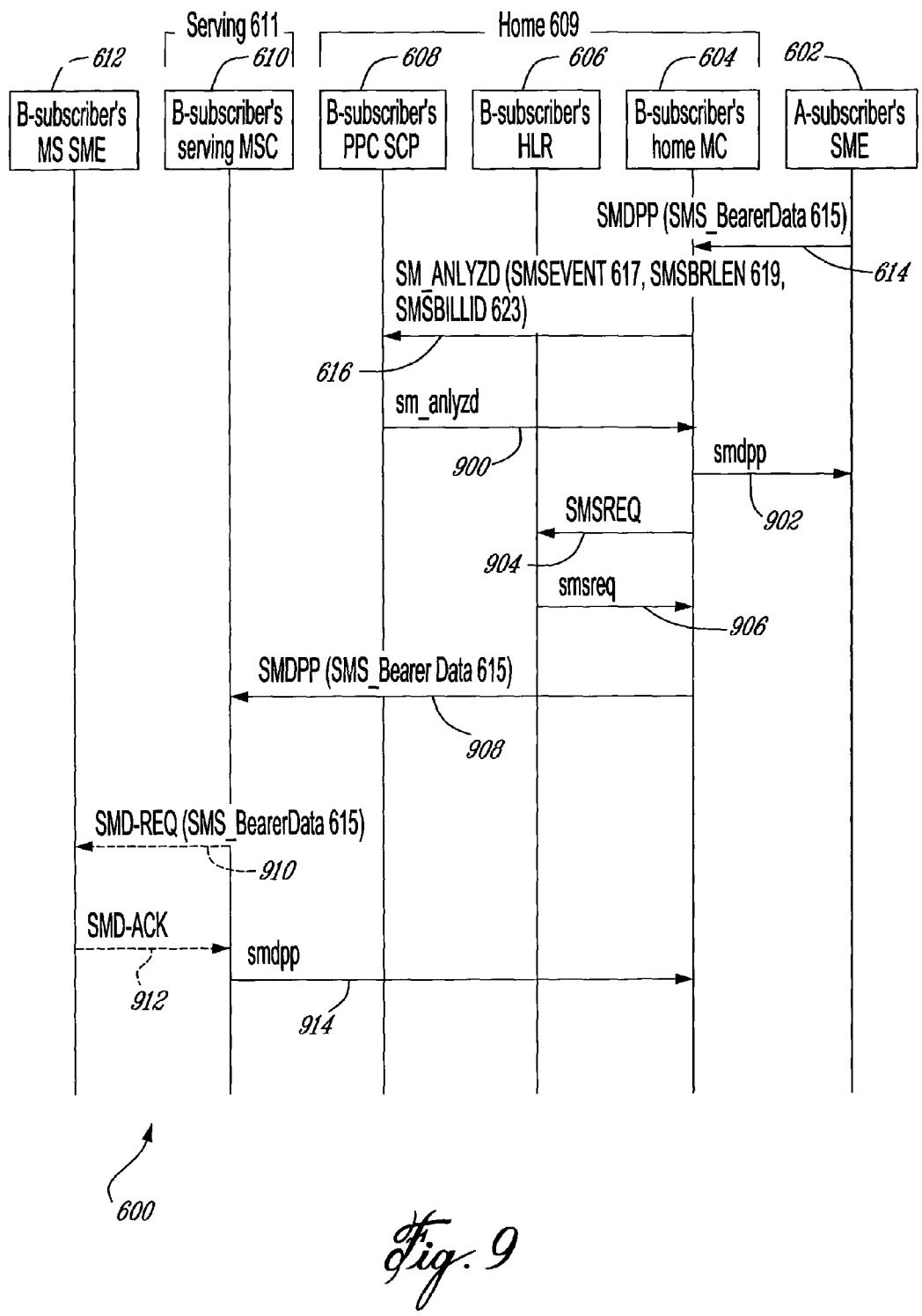
FIG. 9 is a flow chart showing an exemplary flow of messages for PPC of Mobile Station-terminated short message delivery in a telecommunications network with no further charges in accordance to the invention.

With reference made back concurrently to FIGS. 6 and 7A the PPC SCP 608 determines that no additional charges shall be apply for this short message delivery, at step 708 of FIG. 7A. Therefore, steps from FIG. 7C are performed. Reference is now made concurrently to FIG. 9, which is a is a flow chart showing an exemplary flow of messages for PPC of Mobile Station-terminated short message delivery in the telecommunications network 600 with no further charges and to FIG. 7C, which is a flow chart showing a method for PPC of Mobile Station-terminated short message in the telecommunications network 600 in accordance to the invention. In FIG. 9, the telecommunication nodes 602 to 612 and the messages 614 and 616 are the same as the ones described in FIG. 6. After the determination from the PPC SCP 608 that no charges shall apply for this short message delivery, the PPC SCP 608 generates and sends an sm_anlyzd message 900 to the home MC 604 (step 744). At step 746, the home MC 604 sends an smdpp message 902 to the A-subscriber's SME 602 for responding to the SMDPP 614. Next, the home MC 604 stores the short message and initiates delivery actions (step 748). At step 750, the home MC 604 sends an SMSREQ message 904 to the HLR 606 for retrieving an SMS routing address for the destination MS-based SME 612. The HLR 606 responds to the home MC 604 with an smsreq message 906 for returning the SMS routing address (step 752). Following this, the home MC 604 sends to the serving MSC 610 an SMDPP message 908 for delivering the short message (step 754). Next, the serving MSC 610 converts the SMDPP 908 into an SMD-REQ 910 (step 755) and sends the SMD-REQ 910 to the MS-based SME 612 (step 756). At step 758, the MS-based SME 612 may not be accessible. If the MS-based SME 612 is accessible, the MS-based SME 612 sends an SMD-ACK message 912 to the serving MSC 610 for acknowledging reception of the short message (SMD-REQ 910) (step 760). Subsequently, the serving MSC converts the SMD-ACK message 912 into an smdpp message 914 (step 762) and sends it to the home MC 604 of the B-subscriber (step 764).

Figure 10:
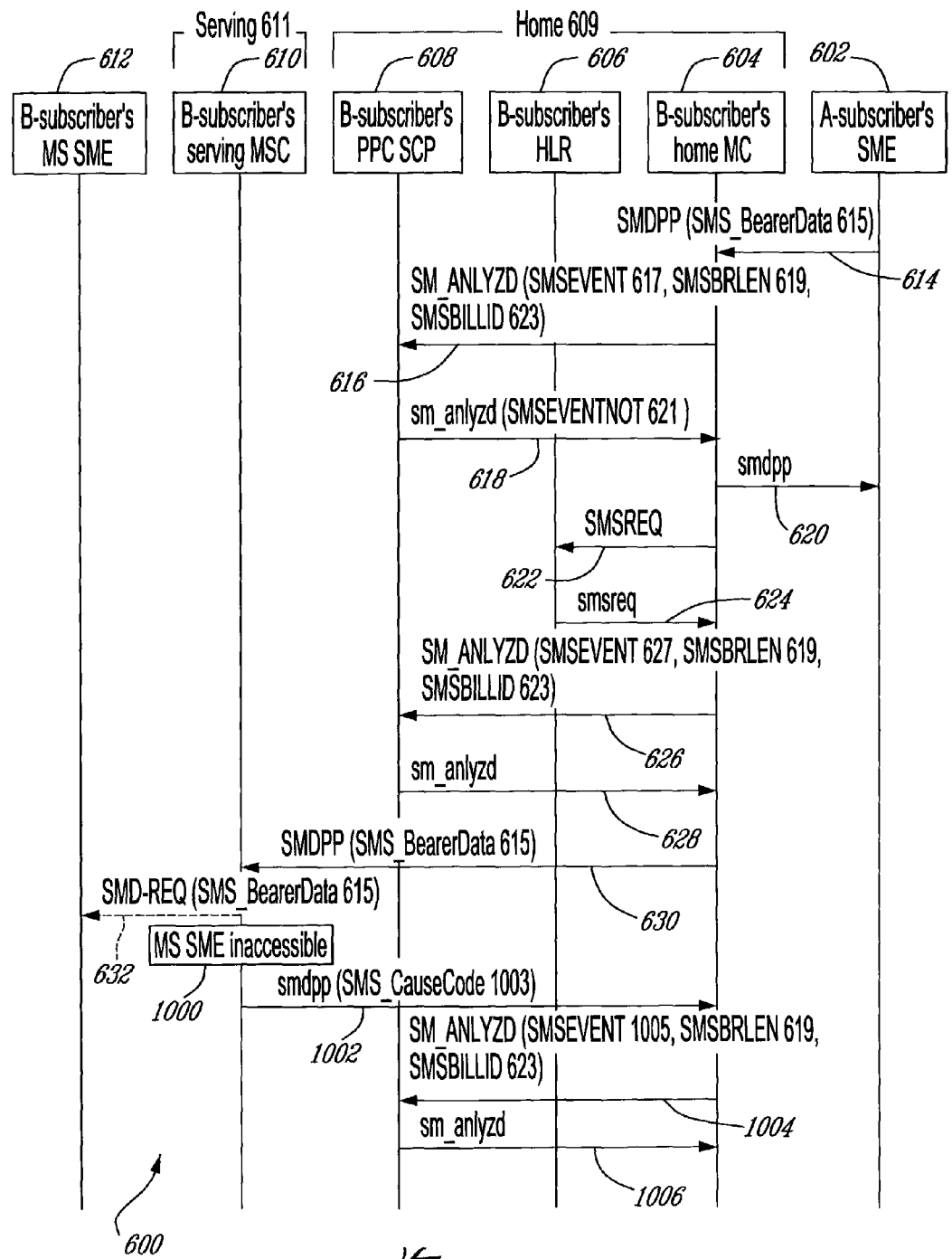
FIG. 10 is a flow chart showing an exemplary flow of messages for a Mobile Station-terminated short message not delivered to PPC MS-SME subscriber when the MS-based SME is not accessible in accordance to the invention.

Alternatively, at steps 731 of FIG. 7D or at step 758 of FIG. 7C the MS-SME 612 may not be accessible for reasons such as the MS-based SME 612 is out of coverage or power down. Therefore, steps of FIG. 7E are performed. Reference is now concurrently made to FIG. 10, which is a flow chart showing an exemplary flow of messages for a Mobile Station-terminated short message not delivered to the B-subscriber when the MS-based SME 612 is not accessible and to FIG. 7E, which is a flow chart showing a method for PPC of Mobile Station-terminated short message in a telecommunications network 600 in accordance to the invention. In FIG. 10, the telecommunication nodes 602 to 632 and the messages 614 to 626 are the same as the ones described in FIG. 6. In FIG. 10, the MS-based-SME 612 does not respond to the SMD-REQ 632 (or SMD-REQ 910) received from the serving MSC 610 and therefore does not send an SMD-ACK to the serving MSC. Consequently, the serving MSC confirms that the MS-based SME 612 is inaccessible at step 1000. For informing the home MC 604, the serving MSC 610 sends an smdpp message 1002 to the home MC 604 of the B-subscriber (step 768). The smdpp message 1002 contains an SMS_CauseCode parameter 1003 indicating "Service Denied". At step 770, the home MC 604 determines that SMS event notification is not applicable and therefore performs the step 778 only. However, if SMS event notification is applicable, the home MC 604 sends an SM_ANLYZD message 1004 to the PPC SCP 608 (step 772). The SM_ANLYZD 1004 is for informing the PPC SCP 608 that SMS event notification is applicable to the short message. The SM_ANLYZD message 1004 includes an SMSEVENT parameter 1005 indicating that the chargeable event encountered is "MS-Terminated Unsuccessful short message delivery to MS-based SME". The SM_ANLYZD message 1004 also includes the same SMSBRLEN 619 and SMSBILLID 623 parameters sent by the home MC 604 in the SM_ANLYZD message 616, and other parameters received in the SMDPP message 614 from the SME 602. The SM_ANLYZD 638 may also include the SMSPMCNT parameter. Upon reception of the SM_ANLYZD message 1004, the PPC SCP 608 does not commit deduction that has been reserved from the B-subscriber's account balance (step 774). Following this, the PPC SCP 608 generates and sends an sm_anlyzd message 1006 for responding to the SM_ANLYZD message 1004 (step 776). Afterwards, the home MC 604 deletes the short massage or stores it for delivery at a later time (step 778).

Figure 7G:
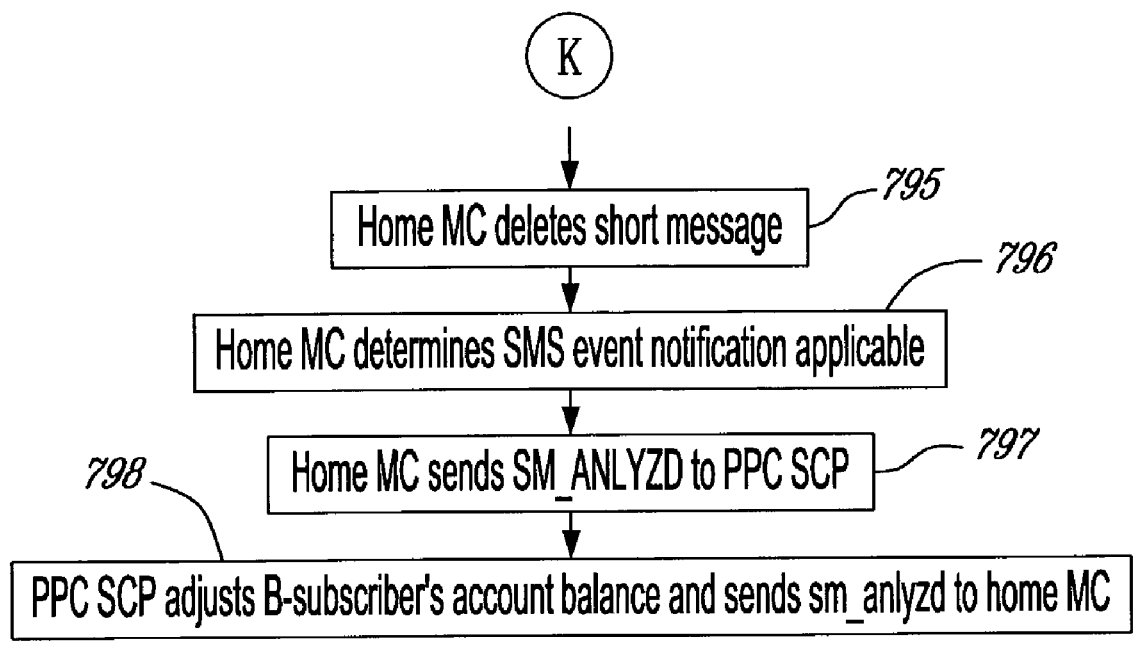
Figure 12:
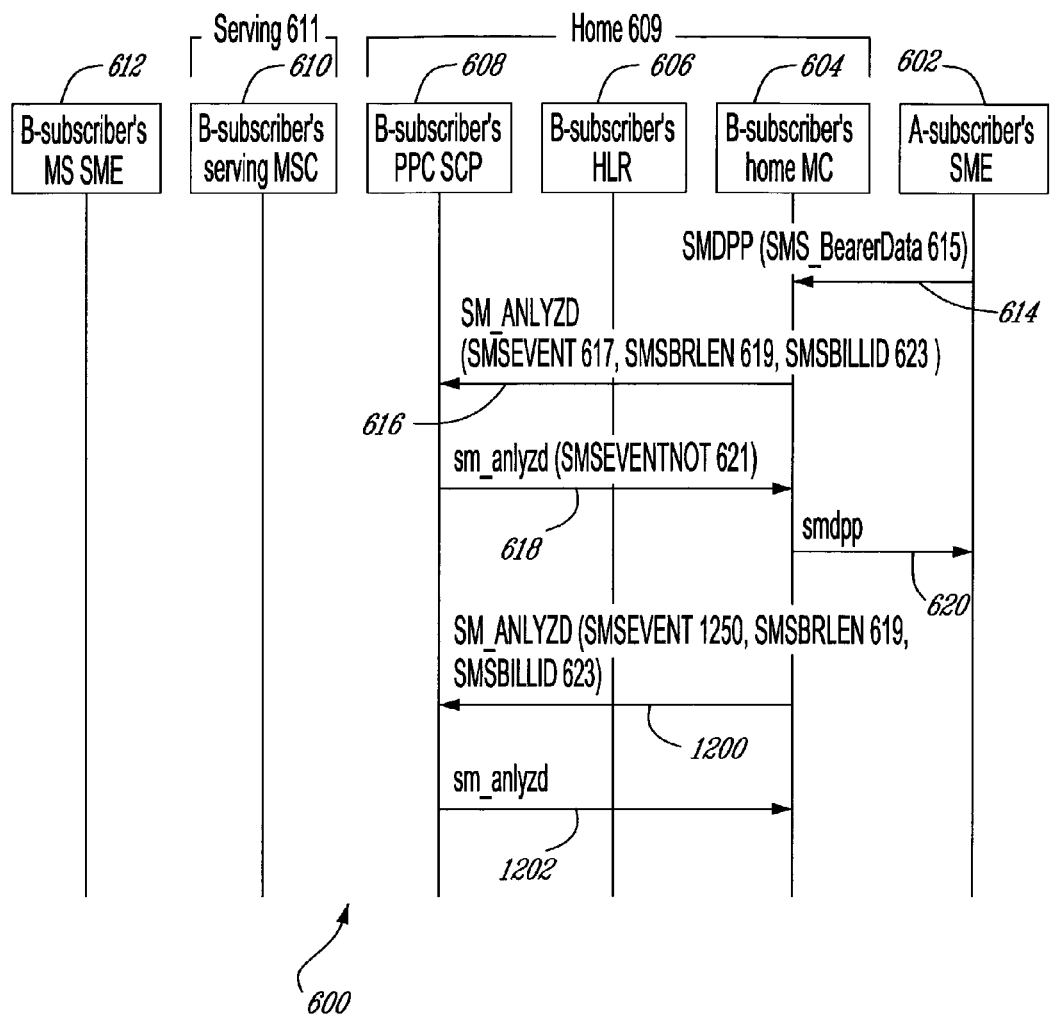
FIG. 12 is a flow chart showing an exemplary flow of messages for PPC of Mobile Station-terminated short message deleted by a home MC in accordance to the invention.

Alternatively, with reference being now made back to FIGS. 6, 7A, 7B, 7E, and 7F, the home MC 604 may delete the short message at step 713 of FIG. 7A, at step 742 of FIG. 7B, at step 778 of FIG. 7E, and at step 794 of FIG. 7F. Reference is now made to FIG. 12, which is a is a flow chart showing an exemplary flow of messages for PPC of Mobile Station-terminated short message deleted by a MC and to FIG. 7G, which is a flow chart showing a method for PPC of Mobile Station-terminated short message in the telecommunications network 600 in accordance to the invention. FIG. 12 shows an example of a deletion of the short message at step 713 of FIG. 7A, but a similar signaling can be applied following steps 742 of FIG. 7B, at step 778 of FIG. 7E, and at step 794 of FIG. 7F. In FIG. 12, the telecommunication nodes 602 to 612 and the messages 614 to 620 are the same as the ones described in FIG. 6. In FIG. 12, the home MC 604 deletes the short message (step 795) and determines that an SMS event notification is applicable (step 796). For doing so, the home MC 604 formulates and sends an SM_ANLYZD message 1200 to the PPC SCP 108 (step 797). The SM_ANLYZD 1200 is for informing the PPC SCP 608 that SMS event notification is applicable to the short message. The SM_ANLYZD message 1200 includes an SMSEVENT parameter 1250 indicating that the chargeable event encountered is "MS-terminated short message deleted by MC". The home MC 604 also includes in the SM_ANLYZD message 1200 sent to the MC 604 the same SMSBRLEN 619 and SMSBILLID 623 parameters sent by the home MC 604 in the SM_ANLYZD message 616, and other parameters received in the SMDPP message 614 from the A-subscriber's SME 602. The home MC 604 may also include the SMSPMCNT parameter (not shown). Upon reception of the SM_ANLYZD message 1200, the PPC SCP 608 adjusts the A-subscriber's account balance because the short message was deleted before delivery and sends an sm_anlyzd message 1202 to the home MC 604 (step 798). The sm_anlyzd message 1202 is for responding to the SM_ANLYZD message 1200 and may include data for informing the A-subscriber about the adjustment and the updated account balance.

The description of the first embodiment and the second embodiment is herein exemplified with reference to a circuit switched network, such as for example a Time Division Multiple Access (TMDA), a Code Division Multiple Access (CDMA) network or a GSM network. However, the invention is also applicable to packet data network such as CDMA2000, Global System for mobile communication (GSM), or Universal Mobile Telecommunications System (UMTS). Preferably, the flow of messages described above in the first embodiment and the second embodiment may be done over the System Signaling 7 (SS7) protocol. Nevertheless, the same logic can be applied to TCP/IP or other type of signaling.

It can be also understood that some unimportant messages and therefore some parameters sent between network elements in the telecommunications network 100 of FIGS. 1, 3, 4, and 5 and further in the telecommunications network 600 of FIGS. 6, 8, 9, 10, 11, and 12 are omitted for clarity reasons.

Although several preferred embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for PrePaid Charging of short messages in a telecommunications network, the method comprising the steps of:
   receiving a short message at a home Message Center (MC), the short message being originated by an A-subscriber and destined to a B-subscriber;
   responsive to the reception of the short message service, determining at the home MC that prepaid charging is applicable for the short message for at least one of the A-subscriber and the B-subscriber;
   sending from the home MC to a PrePaid Charging Service Control Point (PPC SCP) a Short Message Analyzed (SM ANLYZD) message for notifying the PPC SCP that prepaid charging is applicable for the short message for the at least one of the A-subscriber and the B-subscriber, the SM ANLYZD message including:
   a. a Short Message Service (SMS) Event parameter for indicating a chargeable SMS event;

b. a SMS Bearerlength parameter for indicating a length of the short message; and c. a SMS BillingID parameter for correlating charging operations related to the short message;

verifying at the PPC SCP a prepaid account balance of the prepaid account;

determining at the PPC SCP that the prepaid account balance is sufficient;

updating at the PPC SCP the prepaid account balance;

determining at the PPC SOP that the at least one of the A-subscriber and the B-subscriber is to be charged for further processing of the short message; and charging at the PPC SCP a prepaid account of the at least one of the A-subscriber and the B-subscriber for the short message.

2. The method of claim 1, wherein the A-subscriber is a prepaid subscriber, the home MC is a home MC of the A-subscriber, and the PPC SCP is the PPC SCP of the A-subscriber wherein:

the step of determining comprises determining at the home MC of the A-subscriber that prepaid charging is applicable for the short message for the A-subscriber;

the step of sending comprises sending from the home MC of the A-subscriber to the PPC SCP of the A-subscriber a SM ANLYZD message for notifying the PPC SCP of the A-subscriber that prepaid charging is applicable for the short message for the A-subscriber; and the step of charging comprises charging at the PPC SCP of the A-subscriber a prepaid account of the A-subscriber for the short message.

3. The method of claim 1, wherein the B-subscriber is a prepaid subscriber, the home MC is a home MC of the B-subscriber, and the PPC SCP is the PPC SCP of the B-subscriber wherein:

the step of determining comprises determining at the home MC of the B-subscriber that prepaid charging is applicable for the short message for the B-subscriber;

the step of sending comprises sending from the home MC of the B-subscriber to the PPC SCP of the B-subscriber a SM ANLYZD message for notifying the PPC SCP of the B-subscriber that prepaid charging is applicable for the short message for the B-subscriber; and the step of charging comprises charging at the PPC SCP of the B-subscriber a prepaid account of the B-subscriber for the short message.

4. The method of claim 1, wherein the step of determining at the PPC SCP that the at least one of the A-subscriber and the B-subscriber is to be charged for further processing of the short message further comprises the steps of:

responsive to a receipt of the SM ANLYZD message, sending from the PPC SCP to the home MC an sm_anlyzd message including an SMS_EventNotification parameter for indicating an SMS event notification to be reported to the PPC SCP for the short message; p1 sending the short message in a short message delivery request message from the A-subscriber to a Mobile Switching Center (MSC);

converting at the MSC the short message delivery request message into a Short Message Delivery Point-to-Point (SMDPP);

forwarding the SMDPP message towards the home MC;

responsive to a receipt of an SMDPP, sending from the home MC to the serving MSC an smdpp message;

converting at the serving MSC, the smdpp message into a short message delivery acknowledge message; and sending from the serving MSC to PPC SCP the short message delivery acknowledge message.

5. The method of claim 8, further comprising the steps of:

determining at the home MC that an SMS event notification is applicable for the short message for the at least one of the A-subscriber and the B-subscriber;

sending from the home MC to the PPC SCP a second SM ANLYZD message for notifying the PPC SCP that an SMS event notification is applicable for the short message for the at least one of the A-subscriber and the B-subscriber, wherein the second SM_ANLYZD message including:

a. a second SMS_Event parameter for indicating a chargeable SMS event;

b. the SMS_Bearerlength parameter for indicating the length of the short message; and c. the SMS_BillingID parameter for correlating charging operations related to the short message; charging the prepaid account of the at least one of the A-subscriber and the B-subscriber for the short message; and responsive to a receipt of the second SM_ANLYZD message, sending from the PPC SCP to the home MC an sm_anlyzd message.

6. The method of claim 5, further comprising the steps of:

sending the short message from a home MC of the A-subscriber to a home MC of the B-subscriber; and delivering the short message from the home MC of the B-subscriber to the B-subscriber.

7. The method of claim 5, wherein the step of charging further comprises the steps of:

verifying at the PPC SCP a prepaid account balance of the prepaid account; and determining at the PPC SCP that the prepaid account balance is sufficient.

8. A home Message Center (MC) being capable of receiving a short message, the short message being originated by an A-subscriber and destined to a B-subscriber, the home MC determining that prepaid charging is applicable for the short message for at least one of the A-subscriber and the B-subscriber, and sending to a PrePaid Charging Service Control Point (PPC SCP) a Short Message Analyzed (SM ANLYZD) message for notifying the PPC SCP that prepaid charging is applicable for the short message for the at least one of the A-subscriber and the B-subscriber, the SM ANLYZD message including:

a. a Short Message Service (SMS) Event parameter for indicating a chargeable SMS event;

b. a SMS Bearerlength parameter for indicating a length of the short message; and c. a SMS BillingID parameter for correlating charging operations related to the short message.

9. The home MC of claim 8, wherein the A-subscriber is a prepaid subscriber, the home MC is a home MC of the A-subscriber, and the PPC SCP is the PPC SCP of the A-subscriber, wherein the home MC determines that prepaid charging is applicable for the short message for the A-subscriber, and sends to the PPC SCP of the A-subscriber a SM ANLYZD message for notifying the PPC SCP of the A-subscriber that prepaid charging is applicable for the short message for the A-subscriber.

10. The home MC of claim 8, wherein the B-subscriber is a prepaid subscriber, the home MC is a home MC of the B-subscriber, and the PPC SCP is the PPC SCP of the B-subscriber wherein the home MC determines that prepaid charging is applicable for the short message for the B-subscriber, and sends to the PPC SCP of the B-subscriber a SM ANLYZD message for notifying the PPC SCP of the B-subscriber that prepaid charging is applicable for the short message for the B-subscriber.

11. A PrePaid Charging Service Control Point (PPC SCP) connected to a home MC, the PPC SCP being responsible of prepaid accounting for at least one of an A-subscriber and a B-subscriber and wherein the PPC SCP receives a SM ANLYZD message from a home MC, for indicating that prepaid charging is applicable for a short message for the at least one of the A-subscriber and the B-subscriber, and wherein based on the SM ANLYZD message, the PPC SCP charges a prepaid account of the at least one of the A-subscriber and the B-subscriber for the short message, the SM ANLYZD message including:

a. a Short Message Service (SMS) Event parameter for indicating a chargeable SMS event;
b. a SMS Bearerlength parameter for indicating a length of the short message; and
c. a SMS BillingID parameter for correlating charging operations related to the short message.

12. The PPC SCP of claim 11, wherein the PPC SCP further verifies a prepaid account balance of the prepaid account, determines that the prepaid account balance is sufficient, updates the prepaid account balance, and determines that the at least one of the A-subscriber and the B-subscriber is to be charged for further processing of the short message.

* * * * *

UNITED STATES PATENT AND TRADEMARK OFFICE
CERTIFICATE OF CORRECTION

| | | |
|---|---|---|
| PATENT NO. | : 7,027,799 B2 | Page 1 of 1 |
| APPLICATION NO. | : 10/326083 | |
| DATED | : April 11, 2006 | |
| INVENTOR(S) | : Morin et al. | |

It is certified that error appears in the above-identified patent and that said Letters Patent is hereby corrected as shown below:

On the Title Page, in Field (60), under "Related U.S. Application Data", in Column 1, Line 1, insert -- Provisional application No. 60/380,267 filed on May 15, 2002 & Provisional application No. 60/395,644 filed on July 15, 2002 --.

On Page 2, in Field (56), under "U.S. PATENT DOCUMENTS", in Column 1, Line 2, delete "6,907,116 B1" and insert -- 6,907,116 B2 --, therefor.

On Page 2, in Field (56), under "U.S. PATENT DOCUMENTS", in Column 1, Line 3, delete "6,961,412 B1" and insert -- 6,961,412 B2 --, therefor.

In Column 15, Line 10, in Claim 1, delete "SOP" and insert -- SCP --, therefor.

In Column 15, Line 54, in Claim 4, after "message;" delete "p1".

Signed and Sealed this

Twenty-ninth Day of April, 2008

JON W. DUDAS
*Director of the United States Patent and Trademark Office*